United States Patent
Koga et al.

(10) Patent No.: US 10,766,444 B2
(45) Date of Patent: Sep. 8, 2020

(54) BUMPER BEAM

(71) Applicant: Nippon Steel Corporation, Tokyo (JP)

(72) Inventors: Atsuo Koga, Tokyo (JP); Yoshiaki Nakazawa, Tokyo (JP); Satoshi Hirose, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 16/495,597

(22) PCT Filed: Mar. 7, 2018

(86) PCT No.: PCT/JP2018/008856
§ 371 (c)(1),
(2) Date: Sep. 19, 2019

(87) PCT Pub. No.: WO2018/173759
PCT Pub. Date: Sep. 27, 2018

(65) Prior Publication Data
US 2020/0086815 A1 Mar. 19, 2020

(30) Foreign Application Priority Data
Mar. 23, 2017 (JP) ................................. 2017-057766

(51) Int. Cl.
*B60R 19/18* (2006.01)

(52) U.S. Cl.
CPC ........ *B60R 19/18* (2013.01); *B60R 2019/186* (2013.01); *B60R 2019/1813* (2013.01)

(58) Field of Classification Search
CPC ............ B60R 19/18; B60R 2019/1813; B60R 2019/186; B60R 19/04; F16F 7/12
(Continued)

(56) References Cited

U.S. PATENT DOCUMENTS 8,136,871 B2 * 3/2012 Yoshida .................. C21D 1/42
296/205
2008/0054656 A1 * 3/2008 Guiles ..................... B60R 19/18
293/155
(Continued)

FOREIGN PATENT DOCUMENTS

JP 2007290581 A 11/2007
JP 2009096452 A 5/2009
(Continued)

OTHER PUBLICATIONS

English Abstract & Family List of JP2014043218A.
(Continued)

*Primary Examiner* — Jason S Morrow
*Assistant Examiner* — E Turner Hicks
(74) *Attorney, Agent, or Firm* — Banner & Witcoff, Ltd.

(57) ABSTRACT

A bumper beam 100 includes a closing plate 2 and a hat member 1. The hat member 1 includes a top plate 1a, two flanges 1c, and two walls 1b. The hat member 1 includes a high-strength portion 10H and low-strength portions 10L. The high-strength portion 10H includes a longitudinally middle portion of each of the two walls 1a and extends a length of at least 250 mm. The high-strength portion 10H has a tensile strength not lower than 1.5 GPa. The low-strength portions 10L are located outward of the high-strength portion and extends a length not smaller than the height of the walls. The low-strength portions have a tensile strength lower than the tensile strength of the longitudinally middle portion of the two walls.

14 Claims, 12 Drawing Sheets

(58) Field of Classification Search
USPC .......................... 293/120, 102, 155, 121, 122
See application file for complete search history.

(56) References Cited

U.S. PATENT DOCUMENTS

| | | | |
|---|---|---|---|
| 2009/0066095 A1* | 3/2009 | Karlander | B60R 19/18 |
| | | | 293/102 |
| 2009/0079210 A1* | 3/2009 | Matsumura | B60R 19/24 |
| | | | 293/155 |
| 2014/0062105 A1* | 3/2014 | Shimotsu | B60R 19/18 |
| | | | 293/120 |
| 2017/0021788 A1* | 1/2017 | Arns | B60R 21/34 |
| 2019/0084512 A1* | 3/2019 | Takayanagi | B60R 19/03 |
| 2020/0086815 A1* | 3/2020 | Koga | B60R 19/18 |

FOREIGN PATENT DOCUMENTS

| | | |
|---|---|---|
| JP | 2014043218 A | 3/2014 |
| JP | 2014054909 A | 3/2014 |
| WO | 2016117335 A1 | 7/2016 |
| WO | 2016163054 A1 | 10/2016 |

OTHER PUBLICATIONS

English Abstract & Family List of JP2014054909A.
English Abstract & Family List of WO2016117335A1.
English Abstract & Family List of JP2007290581A.
English Abstract & Family List of WO2016163054A1.
English Abstract & Family List of JP2009096452A.

* cited by examiner

BUMPER BEAM

RELATED APPLICATION DATA

This application is a National Stage Application under 35 U.S.C. 371 of co-pending PCT application number PCT/JP2018/008856 designating the United States and filed Mar. 7, 2018; which claims the benefit of JP application number 2017-057766 and filed Mar. 23, 2017 each of which are hereby incorporated by reference in their entireties.

TECHNICAL FIELD

The present invention relates to a bumper beam with impact resistance.

BACKGROUND ART

A bumper beam is required to have impact resistance. Some bumper beams are composed of a hat member with a hat-shaped cross section and a closing plate joined to the hat member. Such a bumper beam exhibits good impact absorbency per mass when its closing plate is positioned outwardly as determined along the vehicle-length direction. Such a bumper beam, with its closing plate serving as an impact-receiving surface, is known as "inverted-hat". A bumper beam with its hat member's top plate serving as an impact-receiving surface is known as "regular-hat".

For example, WO 2016/117335 (Patent Document 1) discloses an inverted-hat bumper beam including a reinforcing member positioned within. The reinforcing member within improves the efficiency of impact-energy absorption of the bumper beam.

PRIOR ART DOCUMENTS

Patent Documents

Patent Document 1: WO 2016/117335

SUMMARY OF THE INVENTION

Problems to be Solved by the Invention

Some impact tests for automobiles that are planned to be conducted in North America in the future involve causing a pole to hit the middle (center) of the front bumper of an automobile, where the middle (center) is as determined along the vehicle-width direction (this testing is known as "pole front crash testing"). In such impact tests, a concentrated load occurs in the bumper beam's middle portion as determined along the longitudinal direction. Passing these impact tests requires an improvement in the yield strength of the bumper beam. To improve the yield strength of the bumper beam, wall thicknesses of the bumper beam may be increased, or the size of the bumper beam may be increased. However, such measures make it impossible to reduce the weight of the bumper beam and, at the same time, improve the yield strength thereof against an impact.

In view of this, the inventors did research to find a geometry and material for a bumper beam that enables reducing the weight and improving the yield strength against an impact at the same time. Specifically, they focused on an inverted-hat construction, which provides high efficiency per mass, and a material with high tensile strength.

The inventors found that a bumper beam with an inverted-hat construction and using a material with high tensile strength can be made that has reduced weight and improved yield strength. However, they discovered that, in impact tests on bumper beams with this construction, the top plate of the hat member, which forms that side of the beam which is opposite to the side formed by the portion of the closing plate hit by the impacter, may break due to the impact.

In view of this, the present application discloses a bumper beam with an inverted-hat construction and using a material with high tensile strength, where a break due to an impact can be suppressed.

Means for Solving the Problems

A bumper beam according to one aspect of the present invention includes: a closing plate; and a hat member curved along a longitudinal direction to protrude in a direction of the closing plate. The hat member includes: a top plate; two first ridges each positioned on a respective one of both ends of the top plate; two flanges joined to the closing plate; two second ridges positioned at an inner end of a respective one of the flanges; and two walls each positioned between a respective one of the first ridges and a respective one of the second ridges. The hat member includes a high-strength portion and a low-strength portion. The high-strength portion includes a longitudinally middle (center) portion of each of the two walls and extending a length of at least 250 mm. The high-strength portion has a tensile strength not lower than 1.5 GPa. The low-strength portion is provided in the hat member curved along the longitudinal direction to protrude in the direction of the closing plate and is located outward, as determined along the longitudinal direction, of the high-strength portion and extends a length not smaller than a height of the walls, and is extending from one of the two second ridges through the two second walls and the top plate to the other one of the two second ridges. The low-strength portion has a tensile strength lower than a tensile strength of the longitudinally middle (center) portions of the two walls.

Effects of the Invention

The present disclosure provides a bumper beam with an inverted-hat construction and using a material with high tensile strength, where a break due to an impact can be suppressed.

EMBODIMENTS FOR CARRYING OUT THE INVENTION

The inventors investigated the behavior of a bumper beam composed of a member with a hat-shaped cross section (hereinafter referred to as "hat member") and a closing plate joined to the hat member, against an impact. A hat member includes a top plate, two walls extending from both ends of the top plate, and two flanges extending from those ends of the two walls that are opposite to the ends adjacent to the top plate, and extending away from each other.

Figure 12:
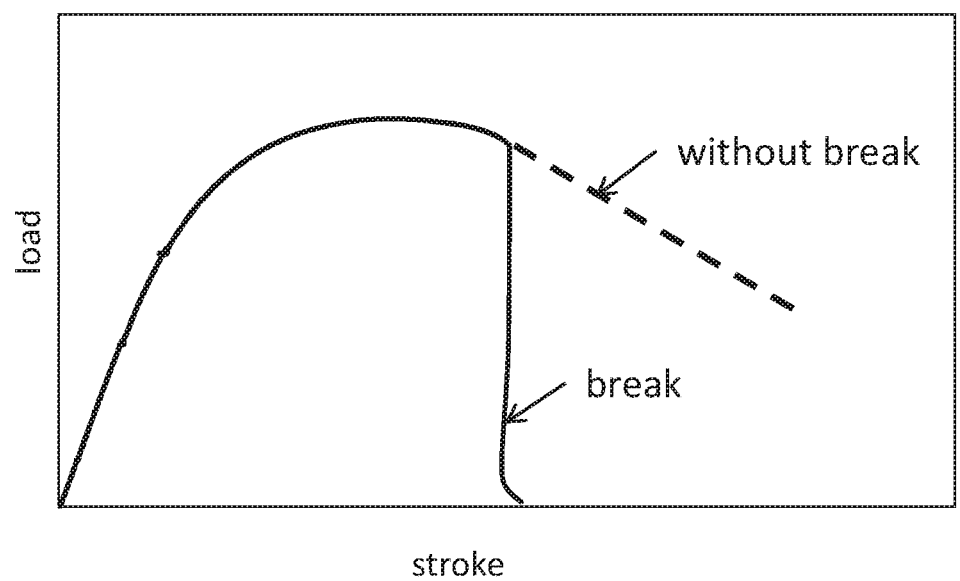
FIG. 12 is a graph showing the relationship between stroke and load as found when the top plate of an inversed-hat bumper beam broke due to an impact.

The inventors did research to increase the maximum load that can be withstood by an inverted-hat bumper beam. They found that using a high-strength material to construct an inverted-hat bumper beam would increase the maximum load. However, in impact tests on inverted-hat bumper beams using a high-strength material with a tensile strength (TS) of 1.5 GPa or higher, the top plate, which forms the beam side opposite to the beam side formed by that portion of the closing plate which is hit by the impacter, may break. FIG. 12 is a graph showing the relationship between stroke and load as found when the top plate of an inverted-hat bumper beam broke due to an impact. As shown in FIG. 12, load becomes zero when the top plate of an inverted-hat bumper beam breaks due to an impact. This significantly reduces the yield strength of the bumper beam.

The inventors did extended research on breaks in the top plate. When a concentrated load is applied to an inverted-hat bumper beam, as in pole front crash tests, bending deformation occurs and, as a result, tensile strain occurs in the top plate. In such cases, strain is largest at the load concentration point. Generally, materials with high tensile strengths have low ductilities, and large strain often causes a fracture. The inventors concluded that, when a material with very high strength and low ductility is used, the top plate may break.

In both regular-hat or inverted-hat bumper beams, the hat member contributes most to the load resistance. Regarding tensile deformation, in a regular-hat bumper beam, the closing plate experiences largest tensile deformation upon application of an impact, whereas, in an inverted-hat bumper beam, the top plate of the hat member experiences largest tensile deformation. A break due to tensile deformation may be suppressed by increasing the ductility, i.e. reducing the strength, of the closing plate in a regular-hat bumper beam or of the hat member in an inverted-hat bumper beam. In a regular-hat beam, the contribution of the closing plate to the load resistance is relatively small; as such, using a material with low strength for the closing plate does not significantly reduce the maximum load. That is, in a regular-hat beam, the strength of the closing plate may be reduced to prevent a break caused by tensile deformation. On the other hand, in an inversed-hat beam, reducing the strength of the hat member, which contributes much to the load resistance, in an attempt to prevent a break significantly reduces the maximum load. Thus, it is difficult to achieve both break prevention and load increase. Further, if the strength of the material of the hat member is to be reduced, the plate thickness must be increased to ensure impact resistance. Thus, it is also difficult to achieve both load increase and weight reduction.

In view of this, the inventors did research to find an inverted-hat construction that prevents a break in the base material while ensuring strength in the middle portion of the beam, in which the bending moment in a cross section upon application of an impact is largest. They arrived at a construction where the middle portion, as determined along the longitudinal direction, of the hat member has a tensile strength not lower than 1.5 GPa and a low-strength portion having a lower tensile strength than the middle portion is located outside a range of the hat member of 250 mm including the longitudinally middle portion and extends a length not smaller than the height of the walls. They found that such a construction prevents a break in the base material in an inverted-hat beam while increasing the maximum load by virtue of a high-strength material. Based on this finding, they arrived at the embodiment described below. It is noted that whether a bumper beam is to be used in a regular-hat or inverted-hat manner can be understood from its shape, since the bumper beam is curved to protrude outwardly as determined along the vehicle-length direction. Specifically, an inverted-hat bumper beam is curved to protrude in the direction of the closing plate. As used herein, "a hat member curved along the longitudinal direction to protrude in the direction of the closing plate" means a hat member of a bumper beam constructed in such a way that the closing plate is to be located outwardly with respect to the vehicle.

(Arrangement 1)

The bumper beam according to the embodiment of the present invention includes: a closing plate; and a hat member curved along a longitudinal direction to protrude in a direction of the closing plate. The hat member includes: a top plate; two first ridges each positioned on a respective one of both ends of the top plate; two flanges joined to the closing plate; two second ridges each positioned at an inner end of a respective one of the flanges; and two walls each positioned between a respective one of the first ridges and a respective one of the second ridges. The hat member includes a high-strength portion and a low-strength portion. The high-strength portion includes a longitudinally middle (center) portion of each of the two walls and extending a length of at least 250 mm. The high-strength portion has a tensile strength not lower than 1.5 GPa. The low-strength portion is provided in the hat member curved along the longitudinal direction to protrude in the direction of the closing plate and is located outward, as determined along the longitudinal direction, of the high-strength portion and extends a length not smaller than a height of the walls, and is extending from one of the two second ridges through the two walls and the top plate to the other one of the two second ridges. The low-strength portion has a tensile strength lower than a tensile strength of the longitudinally middle (center) portions of the two walls.

The bumper beam is supported at two locations on its end portions associated with connecting portions (or vehicle-body attachment portions) of another member, such as a crush box or front side member. How a bumper beam deforms when a concentrated load is applied to the longitudinally middle portion of the bumper beam, as in a pole front crash test, is similar to how a beam deforms in a three-point bending test, in which the middle portion is pushed while both ends are supported. In such cases, the bending moment applied to an entire cross section of the bumper beam is largest at the load concentration point, i.e. the middle (center) portion as determined along the longitudinal direction, and becomes smaller as it goes toward the ends. When the same load is applied to a portion other than the longitudinally middle portion, bending moment is largest at the load concentration point. The bending moment at this load concentration point is lower than the bending moment at the load concentration point found when a load is applied to the longitudinally middle portion. That is, when the same load is applied, the bumper beam is most likely to break when the load is applied to the longitudinal middle portion. Accordingly, the load resistance against a load on the longitudinally middle portion of the bumper beam is important.

Arrangement 1, which includes a hat member curved along the longitudinal direction to protrude in the direction of the closing plate, provides a high-strength portion covering a range of a length of 250 mm in the hat member's middle (center) as determined along the longitudinal direction and having a tensile strength not lower than 1.5 GPa and, in addition, a low-strength portion located outside the high-strength portion as determined along the longitudinal direction and extending a length not smaller than the height of the walls as measured in that range. In this arrangement, the beam portion in which the bending moment is largest upon application of a load due to an impact against the middle portion has a high strength, thereby increasing the maximum load. Further, a low-strength portion is provided outside a range of a length of 250 mm including the longitudinally middle portion such that, upon application of a load to the middle portion, the low-strength portion deforms earlier than the high-strength portion. That is, the low-strength portion, in which deformation initiates, is displaced from the longitudinally middle portion of the bumper beam (i.e. load concentration point) such that the low-strength portion deforms locally before the high-strength portion at the load concentration point deforms. Further, the low-strength portion has a lower tensile strength, and thus a higher ductility, than the middle portion. The low-strength portion extends from one second ridge to the other second ridge via the two walls and top plate. This makes it less likely that a deformation-induced break occurs in the base material of the top plate and two walls in the low-strength portion. Since the low-strength portion has high ductility, it is unlikely to break even when local deformation occurs there. That is, in the low-strength portion, elongation and bending occur instead of fracture. Thus, Arrangement 1 provides a bumper beam that suppresses a break in the base material while using an inverted-hat construction and a high-strength material of 1.5 GPa≤TS to provide a certain maximum load.

The height of the walls is defined as the dimension of the walls as measured in the direction perpendicular to the closing plate. That is, the height of the walls is defined as the distance between the first and second ridges as measured in the direction perpendicular to the closing plate. A bumper beam is sometimes also referred to as bumper reinforcement.

(Arrangement 2)

Starting from Arrangement 1, the tensile strength (TS) of the low-strength portion is preferably lower than 1.5 GPa. If TS<1.5 GPa, this further suppresses a break in the base material while ensuring ductility for the low-strength portion.

(Arrangement 3)

Starting from Arrangement 2, the tensile strength TS of the low-strength portion is preferably higher than 590 MPa. If TS of low-strength portion >590 MPa, this ensures load resistance for the bumper beam even when a load is applied to the low-strength portion.

(Arrangement 4)

Starting from one of Arrangements 1 to 3, the top plate may include two support portions each positioned at a respective one of two separate locations, as determined along the longitudinal direction, on the top plate, where a member for supporting the bumper beam may be attached to the support portions. Preferably, a border between the low-strength portion and the high-strength portion on the walls is located between a position 125 mm away, as measured in the longitudinal direction, from a longitudinal middle (center) of the walls, on one hand, and a position $13/36$ of a longitudinal distance between the two support portions away from the longitudinal middle (center) of the walls. This optimizes the position of the low-strength portion.

(Arrangement 5)

Starting from one of Arrangements 1 to 4, the top plate may include two support portions each positioned at a respective one of two separate locations, as determined along the longitudinal direction, on the top plate, where a member for supporting the bumper beam may be attached to the support portions. Preferably, the low-strength portions are provided on both sides of the high-strength portion and located between the two support portions. As a low-strength portion is provided between support portions of the bumper beam supported by another member, deformation of the low-strength portion is prevented from affecting how the other member deforms. Further, as low-strength portions are provided on both sides of the high-strength portion, local deformation occurs at two locations, thereby dispersing strain. This reduces the strain produced in the top plate compared with implementations where one low-strength portion is provided on one side of the high-strength portion.

As determined along the longitudinal direction of the hat member, an outer high-strength portion may be provided outward of the low-strength portion, toward an end of the hat member. The tensile strength of the outer high-strength portion may be not lower than 1.5 GPa. In such implementations, the border between the outer high-strength portion and the low-strength portion is preferably between the two support portions. That is, the low-strength portion is preferably located between the two support portions. This prevents deformation of the low-strength portion from affecting how the other member deforms.

Alternatively, as determined along the longitudinal direction of the hat member, the low-strength portion may extend from an end of the high-strength portion to an end of the hat member. For example, with a high-strength portion located in the middle as determined along the longitudinal direction, the portions of the hat member other than the high-strength portion may form low-strength portions. This arrangement also allows the bumper beam's portion at the load concentration point in the middle as determined along the longitudinal direction to deform locally. This provides a bumper beam that suppresses a break in the base material while using an inverted-hat construction and a high-strength material of 1.5 TS≥GPa to provide a certain maximum load. Further, this reduces the proportion of the portions with high strength in the hat member compared with implementations where an outer high-strength portion is provided outside the low-strength portion as determined along the longitudinal direction. This makes it possible to reduce costs, for example.

The difference between the tensile strength of the low-strength portion and the lower one of the tensile strengths of the two walls as measured at the longitudinal middle may be increased as it goes further away from the longitudinal middle of the two walls. Further, the tensile strength of the low-strength portion may vary depending on the distance between the low-strength portion, on one hand, and the longitudinal middle of the two walls, on the other hand. For example, the low-strength portion may be divided into several sections along the longitudinal direction, where sections farther from the longitudinal middle of the walls have smaller tensile strengths than sections closer to that middle.

(Arrangement 6)

Starting from one of Arrangements 1 to 5, the top plate may include two support portions each positioned at a respective one of two separate locations, as determined along the longitudinal direction, on the top plate, where a member for supporting the bumper beam may be attached to the support portions. If a distance between a middle (center) of the walls and the low-strength portion as measured in the longitudinal direction is larger than 125 mm and equal to or smaller than ¼ of a longitudinal distance between the two support portions, then, the tensile strength of the low-strength portion is preferably not larger than 0.4 times the lower one of the tensile strengths of the longitudinally middle (center) portions of the two walls. If the distance between the middle of the walls and the low-strength portion as measured in the longitudinal direction is larger than ¼ of the longitudinal distance between the two support portions and equal to or smaller than 13/36 of the longitudinal distance between the two support portions, then, the tensile strength of the low-strength portion is preferably not larger than 0.35 times the lower one of the tensile strengths of the longitudinally middle portions of the two walls. If the distance between the middle of the walls and the low-strength portion as measured in the longitudinal direction is larger than 13/36 of the longitudinal distance between the two support portions and equal to or smaller than ½ of the longitudinal distance between the two support portions, then, the tensile strength of the low-strength portion is preferably not larger than 0.2 times the lower one of the tensile strengths of the longitudinally middle portions of the two walls.

Arrangement 6 optimizes the strength of the low-strength portion such that the low-strength portion can locally deform easily directly before the high-strength portion locally deforms. This provides a yield strength substantially equal to that found when the high-strength portion locally deforms. Arrangement 6 exhibits these effects more prominently if there are few factors affecting the bending moment in a cross section other than the difference between the tensile strengths of the high- and low-strength portions. For example, these effects can be more prominent if the thickness of the high-strength portion is equal to the thickness of the walls of the low-strength portion. Alternatively, these effects can be more prominent if no reinforcing member is provided on the high- and low-strength portions.

(Arrangement 7)

Starting from Arrangement 6, if the distance between the middle of the walls and the low-strength portion as measured in the longitudinal direction is larger than 125 mm and equal to or smaller than ¼ of the longitudinal distance between the two support portions, then, the tensile strength of the low-strength portion is preferably not smaller than 0.33 times the lower one of the tensile strengths of the longitudinally middle portions of the two walls. If the distance between the middle of the walls and the low-strength portion as measured in the longitudinal direction is larger than ¼ of the longitudinal distance between the two support portions, and equal to or smaller than 13/36 of the longitudinal distance between the two support portions, then, the tensile strength of the low-strength portion is preferably not smaller than 0.2 times the lower one of the tensile strengths of the longitudinally middle portions of the two walls. If the distance between the middle of the walls and the low-strength portion as measured in the longitudinal direction is larger than 13/36 of the longitudinal distance between the two support portions, and equal to or smaller than ½ of the longitudinal distance between the two support portions, then, the tensile strength of the low-strength portion is preferably not smaller than 0.1 times the lower one of the tensile strengths of the longitudinally middle portions of the two walls.

Arrangement 7 optimizes the strength of the low-strength portion such that the low-strength portion can locally deform more easily directly before the high-strength portion locally deforms. This provides a yield strength substantially equal to that found when the high-strength portion locally deforms.

(Arrangement 8)

Starting from one of Arrangements 1 to 5, it is preferable that the bumper beam further include a reinforcing member attached to at least part of an area of the walls having the high-strength portion and an area of the closing plate overlapping the high-strength portion in the longitudinal direction. This reduces the overall thickness of the beam to reduce the weight while keeping the impact resistance. Further, the difference between the tensile strength TS of the low-strength portion and the tensile strength TS of the middle portions, as determined along the longitudinal direction, of the walls, ΔTS, is reduced.

(Arrangement 9)

Starting from Arrangement 8, the reinforcing member may be provided in contact with the two walls and located between the two walls and closer to the closing plate than a middle portion, as determined along the height direction, of the walls. For example, the reinforcing member may be constituted by a reinforcing plate positioned inside the hat member and parallel to the closing plate. Alternatively, the reinforcing member may be constituted by a resin (foam) filling the space inside the hat member.

(Arrangement 10)

Starting from Arrangement 8 or 9, if a distance between a middle of the walls and the low-strength portion as measured in the longitudinal direction is larger than 125 mm and equal to or smaller than ¼ of a longitudinal distance between the two support portions, then, the tensile strength of the low-strength portion is preferably not larger than 0.68 times a lower one of the tensile strengths of the longitudinally middle portions of the two walls. If the distance between the middle of the walls and the low-strength portion as measured in the longitudinal direction is larger than ¼ of the longitudinal distance between the two support portions, and equal to or smaller than 13/36 of the longitudinal distance of the two support portions, then, the tensile strength of the low-strength portion is preferably not larger than 0.54 times the lower one of the tensile strengths of the longitudinally middle portions of the two walls. If the distance between the middle of the walls and the low-strength portion as measured in the longitudinal direction is larger than 13/36 of the longitudinal distance between the two support portions, and equal to or smaller than ½ of the longitudinal distance between the two support portions, then, the tensile strength of the low-strength portion is preferably not larger than 0.2 times the lower one of the tensile strengths of the longitudinally middle portions of the two walls.

Arrangement 10 optimizes the strength of the low-strength portion of a beam including a reinforcing member such that the low-strength portion can locally deform easily directly before the high-strength portion locally deforms.

This provides a yield strength substantially equal to that found when the high-strength portion locally deforms.

(Arrangement 11)

If the distance between the middle of the walls and the low-strength portion as measured in the longitudinal direction is larger than 125 mm and equal to or smaller than ¼ of the longitudinal distance between the two support portions, then, the tensile strength of the low-strength portion is preferably not smaller than 0.6 times the lower one of the tensile strengths of the longitudinally middle portions of the two walls. If the distance between the middle of the walls and the low-strength portion as measured in the longitudinal direction is larger than ¼ of the longitudinal distance between the two support portions, and equal to or smaller than 13/36 of the longitudinal distance between the two support portions, then, the tensile strength of the low-strength portion is preferably not smaller than 0.45 times the lower one of the tensile strengths of the longitudinally middle portions of the two walls. If the distance between the middle of the walls and the low-strength portion as measured in the longitudinal direction is larger than 13/36 times the longitudinal distance between the two support portions, and equal to or smaller than ½ of the longitudinal distance between the two support portions, then, the tensile strength of the low-strength portion is preferably not smaller than 0.1 times the lower one of the tensile strengths of the longitudinally middle portions of the two walls.

Arrangement 11 further optimizes the strength of the low-strength portion of a beam including a reinforcing member such that the low-strength portion can locally deform more easily directly before the high-strength portion locally deforms. This provides a yield strength substantially equal to that found when the high-strength portion locally deforms.

(Arrangement 12)

Starting from one of Arrangements 1 to 5, 8 and 9, a through-hole may be provided in part of the low-strength portion of the top plate or the two walls. The through-hole adjusts the difference between the tensile strengths of the high and low-strength portions.

(Arrangement 13)

Starting from one of Arrangements 1 to 5, 8, 9 and 12, for each of the two walls, the height of the wall as measured in at least part of the low-strength portion may be smaller than the height of the wall as measured at the longitudinal middle. Reducing the height of the wall as measured in the low-strength portion adjusts the difference between the tensile strengths of the high and low-strength portions.

(Arrangement 14)

Starting from one of Arrangements 1 to 5, 8, 9, 12 and 13, for each of the two walls, the thickness of the wall as measured in at least part of the low-strength portion may be smaller than the thickness of the wall as measured at the longitudinal middle. Reducing the thickness of the wall of the low-strength portion adjusts the difference between the tensile strengths of the high and low-strength portions.

Embodiment

Figure 1:
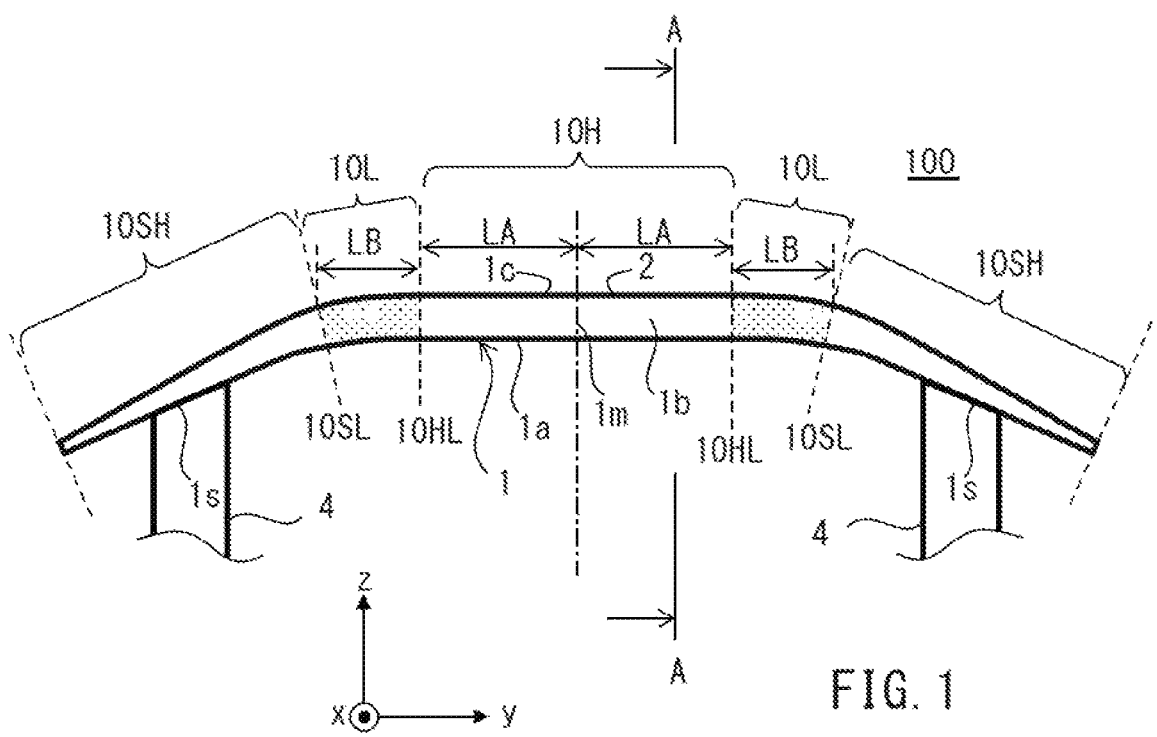
FIG. 1 is a side view of a bumper beam according to the present embodiment.
Figure 2:
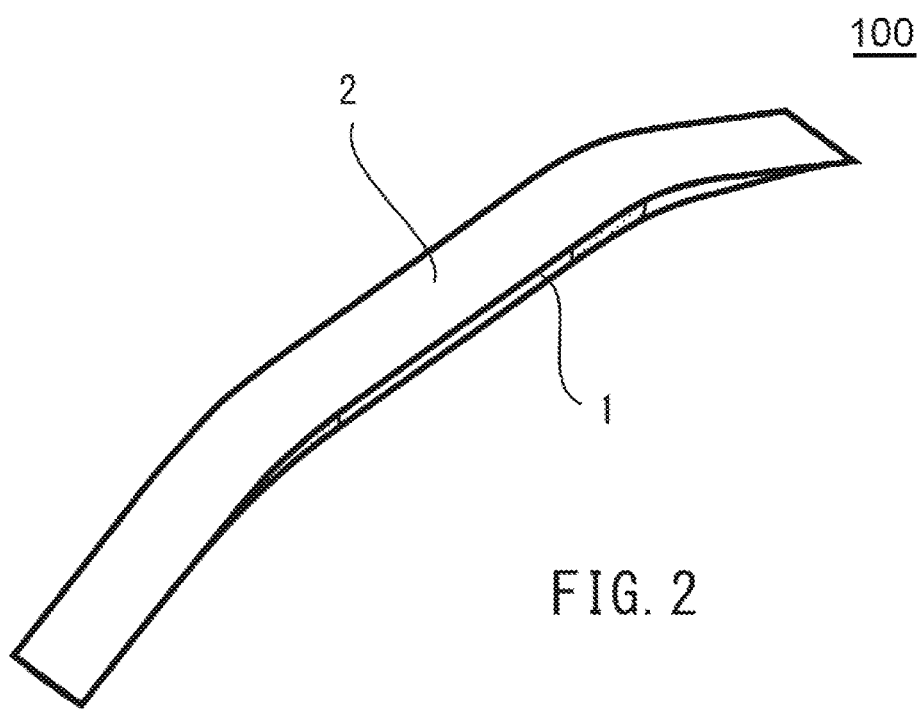
FIG. 2 is a perspective view of the bumper beam shown in FIG. 1.
Figure 3:
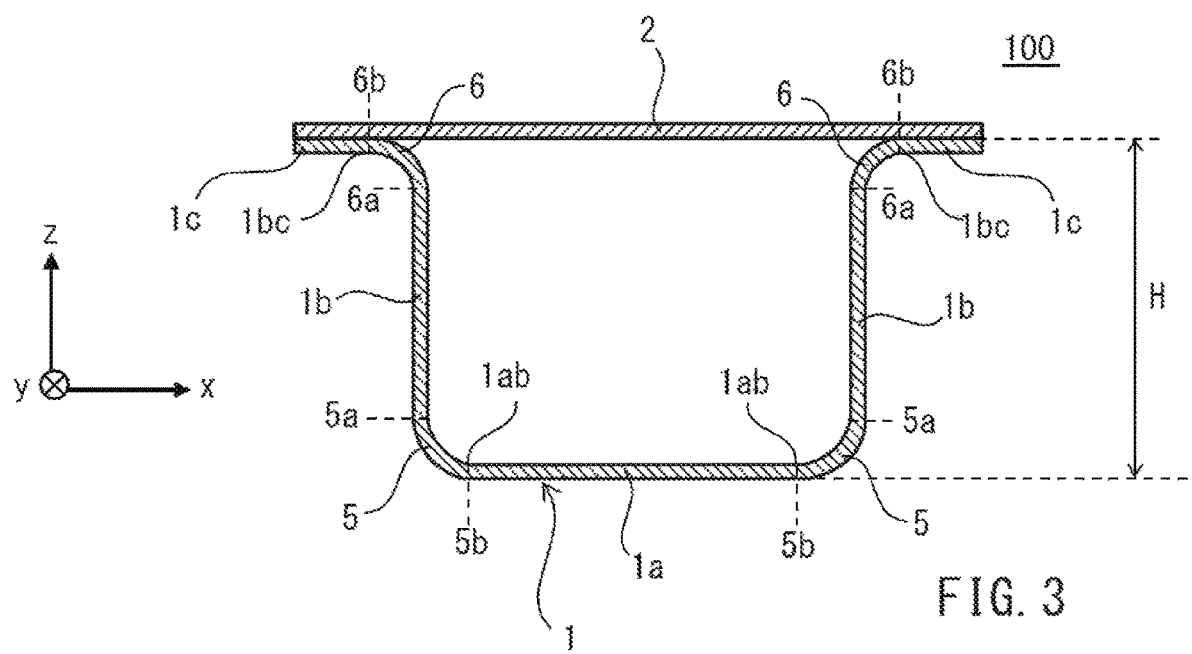
FIG. 3 is a cross-sectional view of the bumper beam of FIG. 1 taken along A-A line.

FIG. 1 is a side view of a bumper beam 100 according to the present embodiment. FIG. 2 is a perspective view of the bumper beam 100 shown in FIG. 1. FIG. 3 is a cross-sectional view of the bumper beam 100 of FIG. 1 taken along line A-A. As shown in FIGS. 1, 2 and 3, the bumper beam 100 includes a hat member 1 and a closing plate 2 joined to the hat member 1. The bumper beam 100 has a closed cross-section structure, formed by the hat member 1 and closing plate 2.

As shown in FIGS. 1 and 2, the bumper beam 100 is curved along the longitudinal direction to protrude from the hat member 1 toward the closing plate 2. Thus, the hat member 1 is curved along the longitudinal direction to protrude in the direction of the closing plate 2. In this way, a bumper beam shaped to be curved to protrude in the direction of the closing plate 2 is an inverted-hat bumper beam with its closing plate 2 serving as a load-receiving surface. When the bumper beam 100 is mounted on a vehicle, the closing plate 2 is located outwardly as determined along the vehicle-length direction. The vehicle-length direction is defined as the front-rear direction of the vehicle, while the vehicle-width direction is defined as the left-right direction of the vehicle.

As shown in FIG. 3, the hat member 1 of the bumper beam 100 includes a top plate 1a, two walls 1b extending from both ends of the top plate, and two flanges 1c extending from the two walls 1b. The two walls 1b extend to face each other. The two flanges 1c extend away from each other from those ends of the two walls 1b which are opposite to the ends adjacent to the top plate 1a.

A first ridge 1ab is present between the top plate 1a and each of the two walls 1b. A first ridge 1ab is located on each of the ends of the top plate 1a. Further, a second ridge 1bc is present between each of the two walls 1b and the associated flange 1c. The second ridges 1bc are located on those ends of the two flanges 1c which face each other, i.e. the inner ends. Each wall 1b is located between a first ridge 1ab and a second ridge 1bc. That is, one end of the wall 1b is adjacent to the first ridge 1ab, while the other end of the wall 1b is adjacent to the second ridge 1bc.

The first and second ridges 1ab and 1bc all extend in the longitudinal direction of the hat member 1. In the implementation shown in FIG. 1, the first and second ridges 1ab and 1bc are curved to protrude from the hat member 1 toward the closing plate 2. The hat member 1 has portions where the first and second ridges 1ab and 1bc are parallel and portions where the first and second ridges 1ab and 1bc are not parallel.

The longitudinal direction of the bumper beam 100 is defined as the direction in which the dimension of the bumper beam is largest. In the implementation shown in FIG. 1, the y-direction represents the longitudinal direction. When the bumper beam 100 is mounted on the vehicle, the vehicle-width direction represents the longitudinal direction of the bumper beam 100. Further, the longitudinal direction of the bumper beam 100, the longitudinal direction of the hat member 1 and the longitudinal direction of the walls 1b coincide.

A curved portion (or round portion) 5 is provided along the border between each of the two walls 1b and the top plate 1a. That is, an end portion of the wall 1b including the one end thereof is round and curved in shape. As such, the surface of the associated shoulder of the hat member, located along the border between the wall 1b and top plate 1a, is curved. The height H of the wall 1b as measured in the direction perpendicular to the closing plate 2 is determined assuming that the curved (or round) portion 5 is part of the wall 1b. That is, that border of the curved (or round) portion 5 which is adjacent to the top plate 1a (or end of the round portion), 5b, defines one end of the wall 1b. The associated first ridge 1ab is adjacent to the one end of the wall 1b, i.e. the border of the round portion 5b.

A curved portion (or round portion) 6 is provided along the border between each of the two walls 1b and the associated one of the two flanges 1c. That is, an end portion of the wall 1b including the other end thereof is round and curved in shape. As such, the surface of the associated shoulder of the hat member 1, located along the border between the wall 1b and flange 1c, is curved. The height H of the wall 1b as measured in the direction perpendicular to the closing plate 2 is determined assuming that the curved (or round) portion 6 is part of the wall 1b. That is, that border of the curved (or round) portion 6 which is adjacent to the flange 1c (or end of the round portion), 6b, defines the other end of the wall 1b. The associated second ridge 1bc is adjacent to the other end of the wall 1b.

As shown in FIG. 1, the hat member 1 includes a high-strength portion 10H in each of the two walls 1b, where the high-strength portion includes the middle portion of the hat member as determined along the longitudinal direction and extends a length of at least 250 mm. The tensile strength of the high-strength portion is not lower than 1.5 GPa.

Low-strength portions 10L are provided in areas of the hat member 1 other than the high-strength portion. The low-strength portions 10L of the hat member are located outward of the high-strength portion 10H as determined along the longitudinal direction. The longitudinal dimension of each low-strength portion 10L, LB, is not smaller than the height H of the walls 1b (LB≥H). The low-strength portion 10L extends from one of the two second ridges 1bc through one wall 1b, the top plate 1a and the other wall 1b to the other one of the two second ridges. The tensile strength of the low-strength portions 10L is lower than the tensile strength of the middle portions, as determined along the longitudinal direction, of the two walls 1b. That is, the tensile strength of the low-strength portions 10L is lower than the lower one of the tensile strengths of the middle portions, as determined along the longitudinal direction, of the two walls 1b.

Thus, providing a high-strength portion at the longitudinal middle of the hat member 1 and providing low-strength portions in areas other than an area with a length of 250 mm including the longitudinally middle portion of the member mean that low-strength portions 10L, in which deformation initiates when the middle portion of the closing plate 2 as determined along the longitudinal direction receives a load, are displaced from the bumper beam's middle 1m as determined along the longitudinal direction (this middle point is also referred to as "load concentration point"). Thus, the low-strength portions 10L will deform locally before the high-strength portion 10H, at the load concentration point, deforms. Further, the low-strength portions 10L have a lower tensile strength, and thus a higher ductility, than the middle portion. Thus, a break in base material due to deformation is unlikely to occur in the low-strength portions 10L. Further, portions including the longitudinally middle portion, in which bending moment is large upon application of a load due to an impact, are constituted by a high-strength portion with a tensile strength not lower than 1.5 GPa, which provides an increased maximum load, thereby improving impact resistance.

The closing plate 2 is located outwardly with respect to the vehicle. The hat member 1 is located inwardly with respect to the vehicle. The hat member 1 is located closer to the inside of the vehicle, i.e. the vehicle interior, than the closing plate 2 is. In the present embodiment, a difference in strength between the low-strength portions 10L and high-strength portion 10H is provided in portions of the bumper beam 100 that are located inwardly with respect to the vehicle, i.e. the top plate 1a and walls 1b. On the other hand, no difference in strength is provided in the closing plate 2. The strength of the closing plate 2 is uniform. That is, differences in strength in the closing plate 2 are negligible compared with the difference in strength in the hat member 1. Providing such a difference in strength in portions of the bumper beam 100 that are located close to the inside of the vehicle or vehicle interior, i.e. top plate 1a and walls 1b of the hat member 1, will prevent a break in the base material. Alternatively, a difference in strength may also be provided in the closing plate 2.

(Example of Positioning of Low-Strength Portions)

Figure 4:
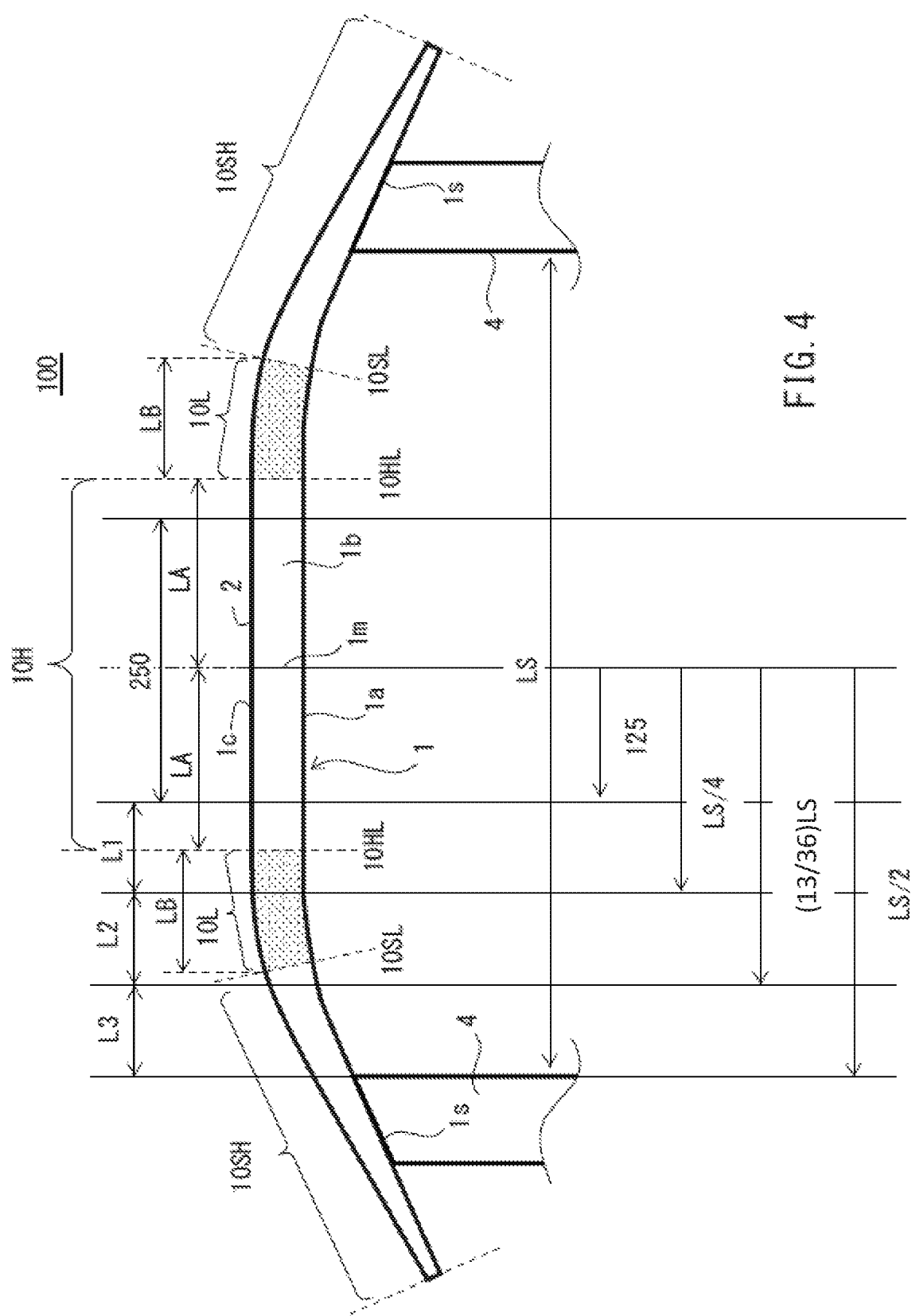
FIG. 4 illustrates a positioning of the low-strength portions of the bumper beam.

FIG. 4 illustrates an example of the positioning of low-strength portions 10L. In the implementation shown in FIG. 4, the bumper beam 100 is supported by two separate support members 4 arranged in the longitudinal direction. The bumper beam 100 is supported by the support members 4 at two separate support portions 1s arranged in the longitudinal direction. A support member 4 may be a side member or a crush box, for example. The support portions 1s of the bumper beam 100 may be fixed to the support members 4 by means of fastening members, such as bolts, or by welding, for example. The bumper beam 100 is mounted on the vehicle with the two separate, longitudinally arranged support portions 1s being supported by the support members.

In the implementation shown in FIG. 4, the border on the walls 1b between a low-strength portion 10L and the high-strength portion 10H, denoted by 10HL, is located in a section L1, which extends from a position 125 mm away from the longitudinal middle 1m of the walls 1b as measured in the longitudinal direction to a position ¼ of the distance LS between the two support portions 1s as measured in the longitudinal direction away from the longitudinal middle 1m of the walls 1b (LS/4). The longitudinal distance, LD, between the section L1 and the longitudinal middle 1m of the walls 1b is in the range from 125 mm to ¼ of the distance LS between the two support portions is (LS/4) (125 mm≤LD≤LS/4).

In the implementation shown in FIG. 4, outer high-strength portions 10SH having a higher tensile strength than the low-strength portions 10L are provided outward of the low-strength portions 10L as determined along the longitudinal direction. The tensile strength of the outer high-strength portions 10SH may be 1.5 GPa. The border, 10SL, on the walls 1b between a low-strength portion 10L and the associated outer high-strength portion 10SH is located in a section L2, which extends from a position 225 mm away, in the longitudinal direction, from the longitudinal middle 1m of the walls 1b to a position 13/36 of the distance LS between the two support portions is ((13/36)LS) away, in the longitudinal direction, from the longitudinal middle 1m of the walls 1b. The longitudinal distance LD between the section L2 and the longitudinal middle 1m of the walls 1b is in the range from ¼ to 13/36 of the distance LS between the two support members 4 (LS/4≤LD≤(13/36)LS). The outer high-strength portions 10SH are provided in a section L3, which extends from a position 13/36 of the longitudinal distance LS between the two support portions is ((13/36)LS) away from the longitudinal middle 1m of the walls 1b to a position ½ of the distance LS between the two support portions is (LS/2). The longitudinal distance LD between the section L3 and the longitudinal middle 1m of the walls 1b is in the range from 13/36 to ½ of the distance LS between the two support members 4 ((13/36)LS≤LD≤LS/2).

The border between a low-strength portion 10L and the high-strength portion 10H is preferably located in the section L1 or section L2, for example. This enables appropriate positioning of the low-strength portions 10L to allow the low-strength portions 10L to deform locally before the high-strength portion 10H deforms upon application of a load due to an impact on the longitudinally middle portion of the closing plate 2.

Further, the low-strength portions 10L are located between the two support portions is as determined along the longitudinal direction. For example, the low-strength portions 10L are more preferably located between the two support members 4 as determined along the longitudinal direction. Yet more preferably, the low-strength portions 10L are located in the section L1 or L2 as determined along the longitudinal direction. Thus, positioning the low-strength portions 10L so as not to overlap the support members 4 as determined along the longitudinal direction reduces the extent to which deformation of the low-strength portions 10L affects the deformation behavior of the support members 4.

The longitudinal dimension LB of each low-strength portion 10L may be not smaller than (3/2)H (LB≥(3/2)H), and may be not smaller than (5/3)H (LB≥(5/3)H). H is the average height of the walls 1b as measured within the area of the low-strength portion 10L. While no particular upper limit is given for the longitudinal dimension LB of each low-strength portion 10L, the longitudinal dimension may be not higher than 3H (LB≤3H), for example.

Figure 5:
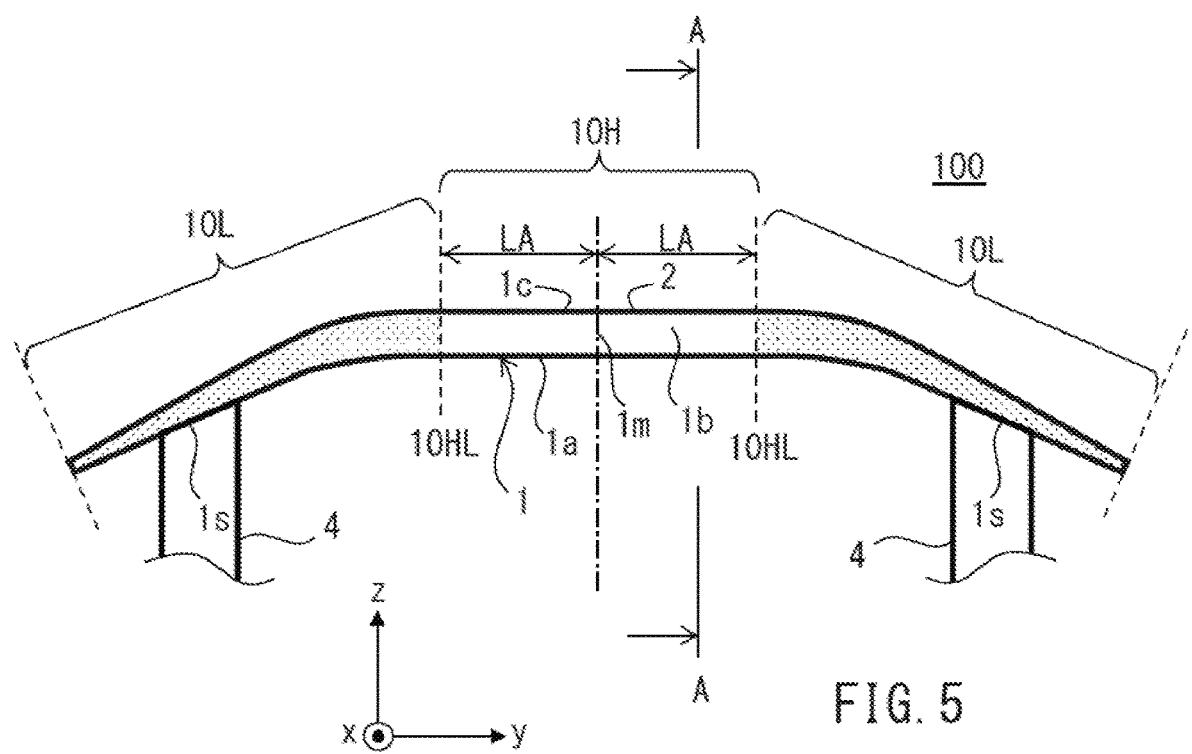
FIG. 5 shows a variation of the bumper beam with a different positioning for the low-strength portions.

FIG. 5 shows a variation of the bumper beam with a different positioning for low-strength portions 10L. In the implementation shown in FIG. 5, as determined along the longitudinal direction of the hat member 1, each of the low-strength portions 10L extends from an end of the high-strength portion 10H to the associated end of the hat member 1. The portions of the hat member 1 other than the high-strength portion 10H constitute the low-strength portions 10L. In the implementation shown in FIG. 5, the ratio of the portions of the hat member that have high tensile strengths, not lower than 1.5 GPa, to the entire member is lower than in the low-strength portion implementation shown in FIG. 1.

Figure 6:
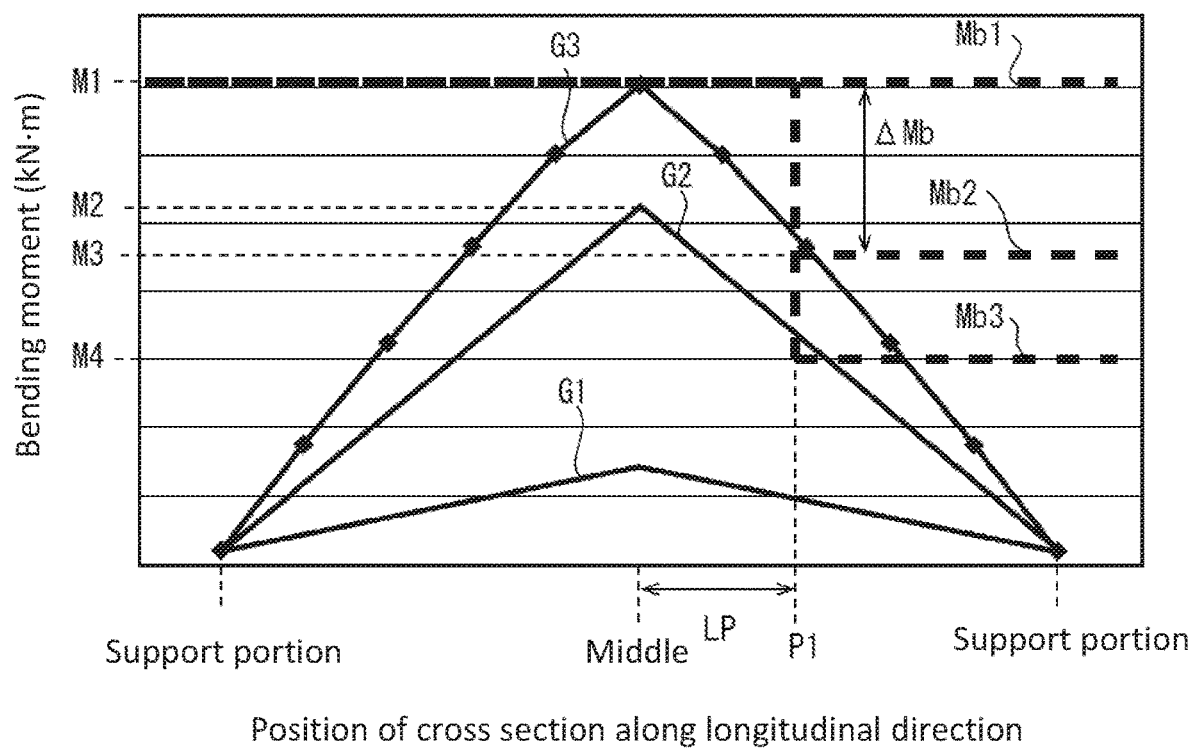
FIG. 6 is a graph showing a bending-moment distribution in cross sections of the bumper beam.

FIG. 6 is a graph showing an example of a bending-moment distribution in a cross section of the bumper beam as determined along the longitudinal direction upon application of a load due to an impact. In the graph shown in FIG. 6, the vertical axis indicates the magnitude of bending moment, while the horizontal axis indicates the position of a cross section along the longitudinal direction. Lines G1, G2 and G3 shown in FIG. 6 each represent bending moments occurring in cross sections upon application of a load. The bending moment occurring in each cross section increases in the order of lines G1, G2 and G3 as the deformation stroke upon application of a load increases. Each of lines G1, G2 and G3 indicates bending moments occurring in various cross sections upon application of a load to the closing plate 2 at the longitudinal middle between the two support portions.

In the graph shown in FIG. 6, broken line Mb1 indicates a bending moment found when a cross section of the bumper beam buckles (hereinafter referred to as "buckling bending moment"). That is, a cross section buckles or collapses when the bending moment occurring in a cross section of the bumper beam reaches the level indicated by broken line Mb1. Broken line Mb1 represents an example of a constant buckling bending moment along the longitudinal direction of the bumper beam.

The buckling bending moment in a cross section depends on the strength of the material forming the cross section, the plate thickness or shape or other constituent elements of the bumper beam, for example. As such, providing the low-strength portions 10L as shown in FIG. 1 makes buckling bending moments of the low-strength portions 10L smaller than bucking bending moments of the high-strength portion 10H as measured at the longitudinal middle of the walls 1b.

Broken line Mb2 indicates a buckling bending moment distribution along the longitudinal direction found if the buckling bending moments (=M3) in that area between the longitudinal middle and one support portion in which the distance from the longitudinal middle is larger than the distance LP are lower than the buckling bending moment (=M1) in the longitudinal middle (M1>M3). For example, a low-strength portion 10L may be provided in that area between the longitudinal middle of the hat member 1 and one support portion in which the distance from the longitudinal middle is larger than the distance LP to provide a buckling bending moment distribution as indicated by broken line Mb2 or Mb3. Broken line Mb3 indicates a buckling bending moment distribution along the longitudinal direction found if the buckling bending moments (=M4) in that area in which the distance from the longitudinal middle is larger than the distance LP are further lower than the buckling bending moment (=M1) in the longitudinal middle (M1>M4).

The deformation behavior for the buckling bending moment distribution indicated by broken line Mb2 will be discussed. For this distribution, the bending moment occurring in a cross section at position P1, the distance LP away from the longitudinal middle, reaches the buckling bending moment=M3 (M1>M3) for this position P1 directly before the bending moment produced by a load in a cross section in the longitudinal middle of the hat member 1 reaches the buckling bending moment in the longitudinal middle=M1, a state indicated by line G3. Thus, a cross section at position P1 buckles earlier than a cross section in the longitudinal middle of the hat member 1.

Thus, even when a load is applied to the closing plate 2 at the longitudinal middle of the hat member 1, local deformation occurs at position P1, which is distant from the longitudinal middle by the distance LP. The maximum load found at the time of deformation caused by a load for the buckling bending moment distribution indicated by broken line Mb2 is generally at the same level as the maximum load for the buckling bending moment distribution indicated by broken line Mb1.

For the buckling bending moment distribution indicated by broken line Mb3, the bending moment occurring in a cross section at position P1 reaches the buckling bending moment at this position P1=M4 (M3>M4) when the bending moment occurring in a cross section in the longitudinal middle reaches M2 (M1>M2), which state is indicated by line G2. At this time, a cross section at position P buckles. Thus, for the buckling bending moment distribution indicated by broken line Mb3, the maximum load at the time of deformation caused by a load is smaller than for the buckling bending moment distribution indicated by broken line Mb2. In view of this, to increase maximum load, it is preferable to optimize the difference ΔMb between the buckling bending moment at the longitudinal middle and the buckling bending moment at the position at which local deformation is desired to occur.

This difference ΔMb in buckling bending moment may be adjusted by, for example, setting the difference in tensile strength, the difference in plate thickness, the difference in the height H of the walls or the like between the low-strength portions 10L and high-strength portion 10H. In the viewpoint of manufacture efficiency, it is preferable to adjust the difference ΔMb in buckling bending moment by setting the difference in tensile strength between the low-strength portions 10L and high-strength portion 10H.

For example, the difference between the tensile strength of the low-strength portions 10L and the tensile strength of the high-strength portion 10H may be increased as the distance between the longitudinal middle of the walls 1b and that end of a low-strength portion 10L that is closer to the longitudinal middle increases. As examples, the low-strength portions may have the strengths listed below.

(Examples of Strengths of Low-Strength Portions)

Examples of the strengths of the low-strength portions will be described with reference to FIG. 4. In implementations where a low-strength portion is located in the section L1, that is, where the longitudinal distance LL between the middle 1m of the walls 1b and the low-strength portion 10L is larger than 125 mm and not larger than ¼ of the distance LS between the two support portions is (125 mm<LL≤LS/4), it is preferable that the tensile strength TS_L of the low-strength portions 10L be not larger than 0.4 times the lower one of the tensile strengths of the two walls 1b as measured at the longitudinal middle 1m, TS_HC (TS_L≤0.4×TS_HC). This will allow the section L1 to deform earlier than the longitudinally middle 1m portion.

In implementations where a low-strength portion is located in the section L2, that is, where the longitudinal distance LL between the middle 1m of the walls 1b and the low-strength portion 10L is larger than ¼ of the distance LS and not larger than 13/36 of the distance LS (LS/4<LL≤(13/36)LS), it is preferable that the tensile strength TS_L of the low-strength portions 10L be not larger than 0.35 times the tensile strength TS_HC (TS_L≤0.35×TS_HC). This will allow the section L1 to deform earlier than the longitudinally middle 1m portion.

In implementations where a low-strength portion is located in the section L3, that is, where the longitudinal distance LL between the middle 1m of the walls 1b and the low-strength portion 10L is larger than 13/36 of the distance LS and not larger than ½ of the distance LS (13/36 LS<LL≤LS/2), it is preferable that the tensile strength TS_L of the low-strength portions 10L be not larger than 0.2 times the tensile strength TS_HC (TS_L≤0.2×TS_HC). This will allow the section L1 to deform earlier than the longitudinally middle 1m portion.

Thus, if the difference in tensile strength between the high-strength portion and low-strength portions increases as it goes away from the longitudinal middle, it is possible to set the tensile strength of the low-strength portions to the suitable range for causing the low-strength portions to deform earlier than the high-strength portion upon application of a load.

Further, having a lower limit for the tensile strength of the low-strength portion for each section makes it possible to reduce the decrease in maximum load. The lower limit for the tensile strength of the low-strength portions may depend on the distance from the longitudinal middle. For example, the lower limit for the tensile strength of the low-strength portions may decrease as the distance from the longitudinal middle increases. As some examples, the low-strength portions may have the following tensile strengths.

For example, starting from the above-discussed implementations, if a low-strength portion is to be provided in the section L1, it is preferable that the tensile strength TS_L of the section L1 be not smaller than 0.33 times and not larger than 0.4 times the tensile strength TS_HC of the longitudinally middle portion (0.33×TS_HC≤TS_L≤0.4×TS_HC). This will allow the section L1 to deform earlier than the longitudinally middle 1m portion and reduce the decrease in the maximum load.

Further, if a low-strength portion is to be provided in the section L2, it is preferable that the tensile strength TS_L of the section L2 be not smaller than 0.2 times and not larger than 0.35 times the tensile strength TS_HC of the longitudinally middle portion (0.2×TS_HC≤TS_L≤0.35×TS_HC). This will allow the section L2 to deform earlier than the longitudinally middle 1m portion and reduce the decrease in the maximum load.

Further, if a low-strength portion is to be provided in the section L3, it is preferable that the tensile strength TS_L of the low-strength portion 10L be not smaller than 0.1 times and not larger than 0.2 times the tensile strength TS_HC (0.1×TS_HC≤TS_L≤0.2×TS_HC). This will allow the section L3 to deform earlier than the longitudinally middle 1m portion and reduce the decrease in the maximum load.

(Example Configurations Including Reinforcing Member)

Figure 7:
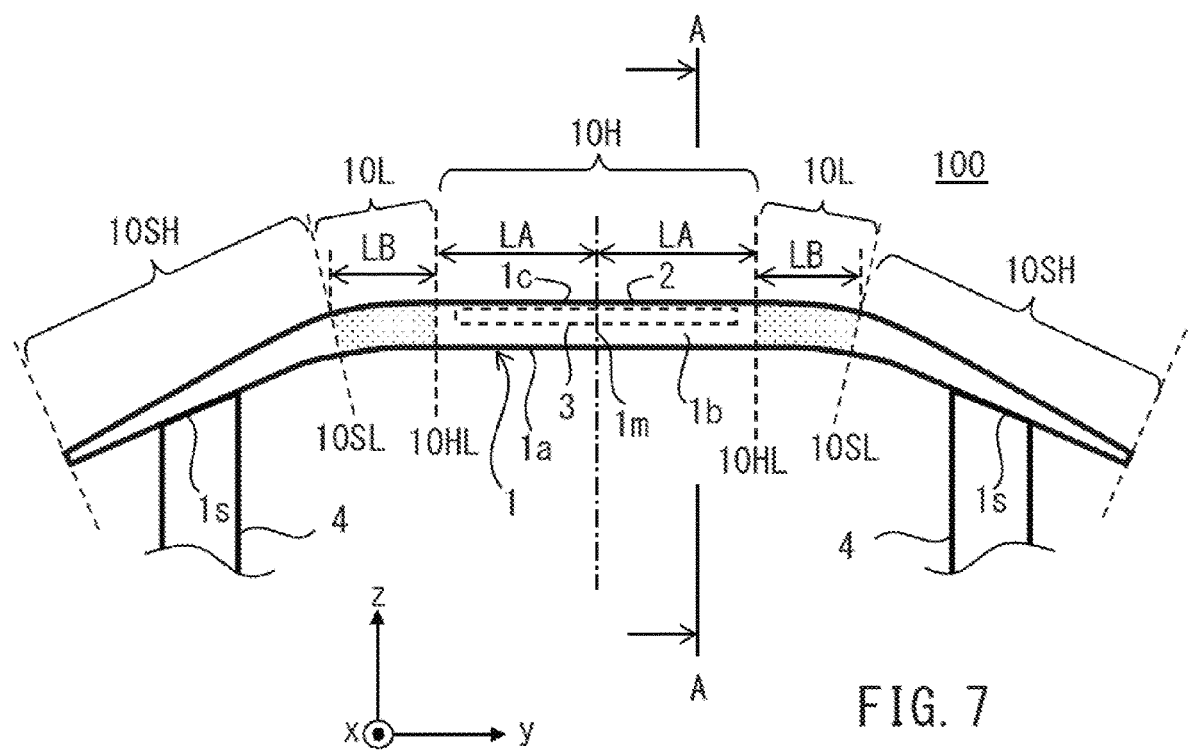
FIG. 7 is a side view of an example construction of a bumper beam including a reinforcing member.
Figure 8:
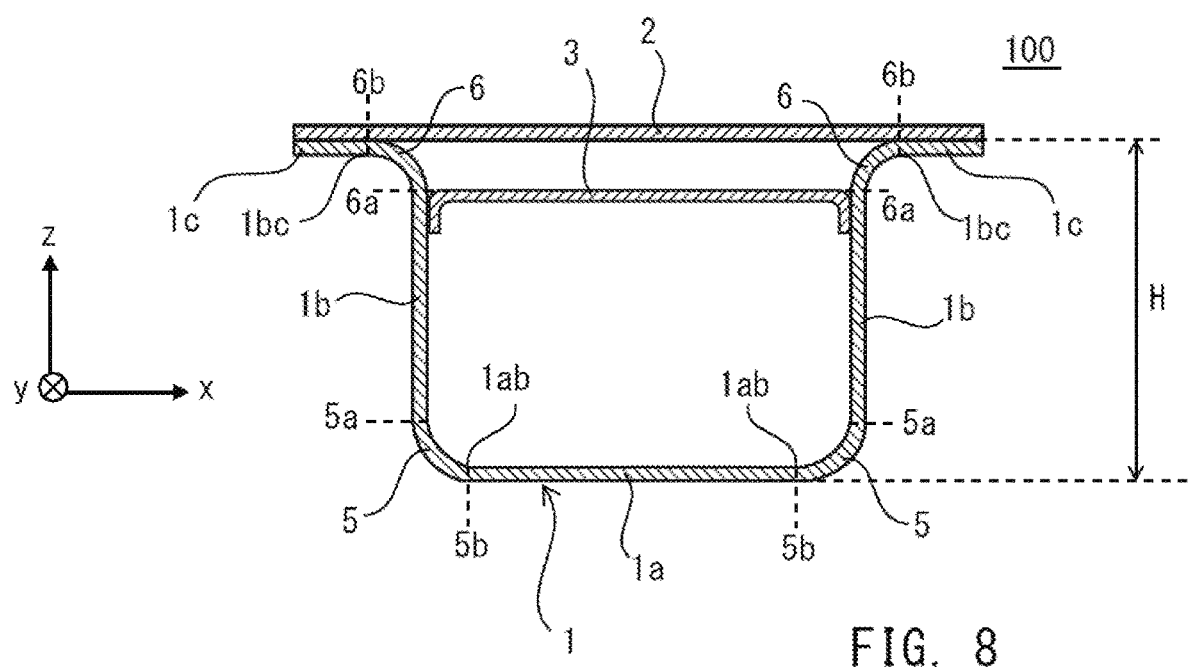
FIG. 8 is a cross-sectional view of the bumper beam of FIG. 7 taken along line A-A.

FIG. 7 is a side view of an example configuration of the bumper beam 100 including a reinforcing member 3. FIG. 8 is a cross-sectional view taken along line A-A of the bumper beam 100 shown in FIG. 7. In FIGS. 7 and 8, the same members as in FIGS. 1 and 3 are labeled with the same numerals.

The bumper beam 100 shown in FIGS. 7 and 8 further includes a reinforcing member 3 attached to the high-strength portion. As shown in FIG. 7, the reinforcing member 3 is positioned to overlap the high-strength portion 10H as determined along the longitudinal direction. In this way, the reinforcing member 3 reinforces the high-strength portion 10H. In the implementation shown in FIG. 7, the reinforcing member 3 is positioned to be included in the high-strength portion 10H as determined along the longitudinal direction. Portions of the reinforcing member 3 may extend outwardly of the high-strength portion 10H as determined along the longitudinal direction.

As shown in FIG. 8, the reinforcing member 3 is positioned in the inner space of the hat member 1. The reinforcing member 3 is in contact with the two walls 1b. The reinforcing member 3 is positioned between the two walls 1b and closer to the closing plate 2 than the middle, as determined along the height direction, of the walls 1b is. The reinforcing member 3 is constituted by a reinforcing plate with its both ends supported by the walls 1b so as to be parallel to the closing plate 2. The reinforcing member 3 is not limited to a particular material. The material of the reinforcing member 3 may be metal, resin or ceramic, for example.

Providing a reinforcing member 3 for reinforcing the high-strength portion 10H will reduce the difference between the tensile strength of the high-strength portion 10H and the tensile strength of the low-strength portions 10L compared with implementations without a reinforcing member 3. This will increase the design freedom for the tensile strength of the low-strength portions 10L.

Figure 9:
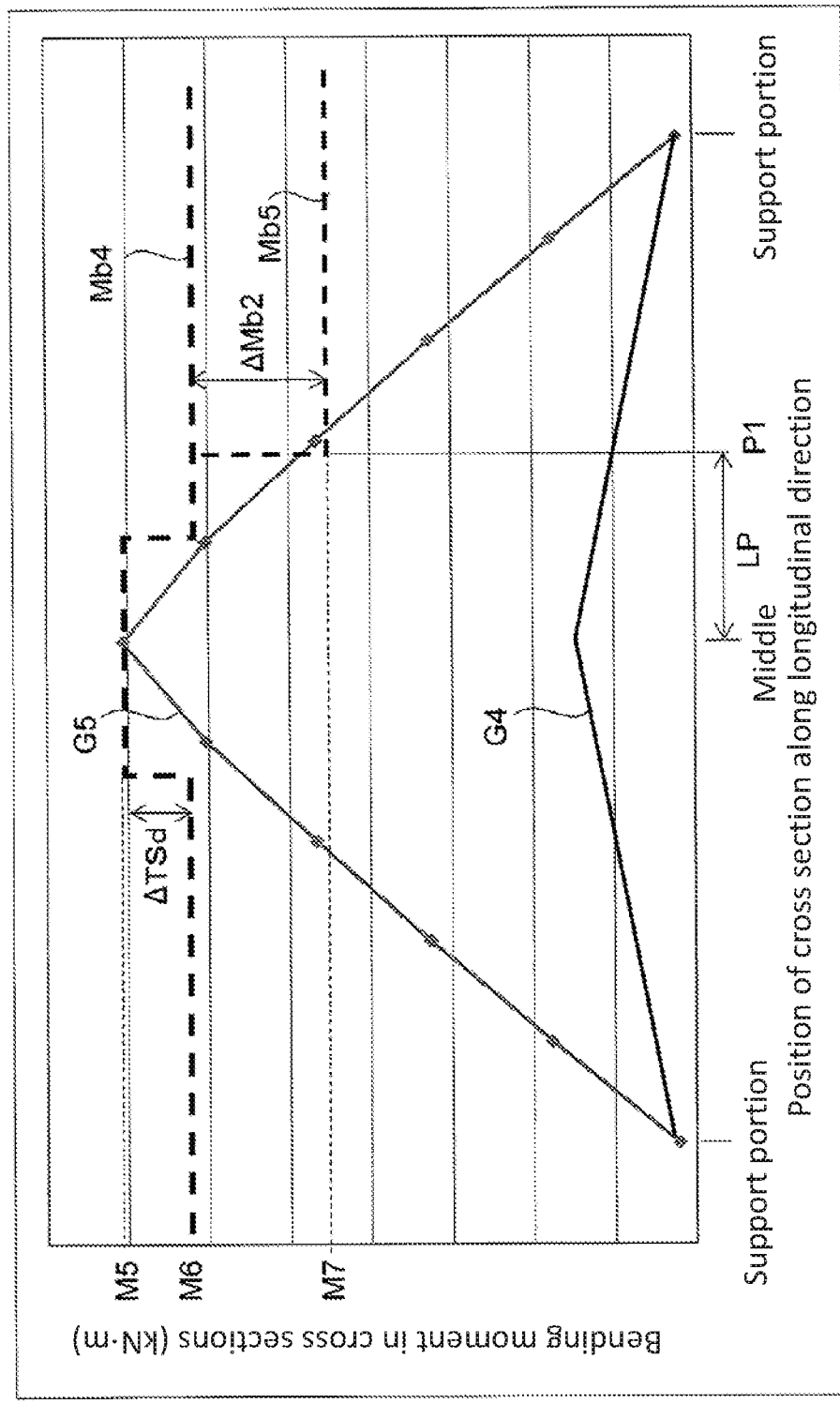
FIG. 9 is a graph showing a bending-moment distribution in cross sections of a bumper beam including a reinforcing member.

FIG. 9 is a graph showing an example bending-moment distribution in a bumper beam 100 including a reinforcing member 3 for reinforcing the high-strength portion 10H. In the graph shown in FIG. 9, broken line Mb4 indicates the buckling bending moment found when buckling occurs in a cross section. That is, a cross section buckles when the bending moment occurring in the cross section reaches the buckling bending moment. Broken line Mb4 shown in FIG. 9 indicates a buckling bending moment distribution along the longitudinal direction found in implementations where a reinforcing member 3 is positioned within a range of 120 mm from the longitudinal middle of a bumper beam having a uniform strength distribution along the longitudinal direction. In this implementation, the buckling bending moments in the area with the reinforcing member 3 (=M5) is higher than the buckling bending moments of adjacent areas (=M6) by ΔMbd (M5−M6=ΔMbd).

Lines G4 and G5 in FIG. 9 each indicate bending moments occurring in cross sections upon application of a load. The bending moment occurring in a cross section increases in the order of lines G4 and G5 as the deformation stroke upon application of a load increases. Each of lines G4 and G5 indicates bending moments occurring in various cross sections upon application of a load to the closing plate 2 at the longitudinal middle between the two support portions. If the bending moment distribution along the longitudinal direction is the distribution indicated by broken line Mb4, a cross section at the longitudinal middle buckles when the bending moment in the cross section as measured at the longitudinal middle reaches the buckling bending moment M5 as measured at the longitudinal middle, which state is indicated by line G5.

For example, when a load due to an impact on the closing plate 2 is applied to the middle portion between the two support portions is of the bumper beam 100, i.e. the middle portion as determined along the longitudinal direction, a cross section at position P1, which is the distance LP away from the longitudinal middle, buckles earlier than the longitudinally middle portion only if the buckling bending moment at position P1 is lower than the buckling bending moment at the longitudinal middle by at least about ΔMb2, as indicated by broken line Mb5. This amount of decrease ΔMb2 is advantageously smaller than the amount of decrease ΔMb in implementations without a reinforcing member 3 as shown in FIG. 6, for example. This is because the implementation illustrated by FIG. 9 includes a reinforcing member 3 attached in such a way that the buckling bending moment at position P1 is lower than the buckling moment at the longitudinal middle by ΔMbd.

This difference ΔMb2 in buckling bending moment can be adjusted by, for example, setting the difference in tensile strength, the difference in plate thickness, the difference in the height H of the walls or the like between the low-strength portions 10L and the high-strength portion 10H.

To effect the difference ΔMb2 in buckling bending moment, for example, each low-strength portion 10L is provided in that area between the longitudinal middle of the two support portions and a support portion in which the distance from the longitudinal middle is larger than the distance LP. In such cases, the difference between the tensile strength of the low-strength portions 10L and the tensile strength of the longitudinally middle portion may depend on the distance LP. For example, the difference between the tensile strength of the low-strength portions 10L and the tensile strength of the high-strength portion 10H increases as the distance between the longitudinal middle of the walls 1b and that end of each low-strength portion 10L which is closer to the longitudinal middle increases.

As an example, if a low-strength portion is to be provided in the section L1, it is preferable that the tensile strength TS_L of the section L1 be not higher than 0.68 times the tensile strength TS_HC of the longitudinally middle portion (TS_L≤0.68×TS_HC). This will allow the section L1 to deform earlier than the longitudinally middle 1m portion.

Further, if a low-strength portion is to be provided in the section L2, it is preferable that the tensile strength TS_L of the section L2 be not higher than 0.54 times the tensile strength TS_HC of the longitudinally middle portion (TS_L≤0.54×TS_HC). This will allow the section L2 to deform earlier than the longitudinally middle 1m portion.

Further, if a low-strength portion is to be provided in the section L3, it is preferable that the tensile strength TS_L of the low-strength portion 10L be not higher than 0.2 times the tensile strength TS_HC (TS_L≤0.2×TS_HC). This will allow the section L3 to deform earlier than the longitudinally middle 1m portion.

The above-discussed examples set upper limits for the low-strength portions in the various sections. In addition, setting lower limits for the low-strength portions in the various sections will reduce the amount of decrease in the maximum load.

As an example, starting from the above examples, if a low-strength portion is to be provided in the section L1, it is preferable that the tensile strength TS_L of the section L1 be not lower than 0.6 times and not higher than 0.68 times the tensile strength TS_HC of the longitudinally middle portion (0.6×TS_HC≤TS_L≤0.68×TS_HC). This will allow the section L1 to deform earlier than the longitudinally middle 1m portion and reduce the decrease in the maximum load.

Further, if a low-strength portion is to be provided in the section L2, it is preferable that the tensile strength TS_L of the section L2 be not lower than 0.45 times and not higher than 0.54 times the tensile strength TS_HC of the longitudinally middle portion (0.45×TS_HC≤TS_L≤0.54×TS_HC). This will allow the section L2 to deform earlier than longitudinally the middle 1m portion and reduce the decrease in the maximum load.

Further, if a low-strength portion is to be provided in the section L3, it is preferable that the tensile strength TS_L of the low-strength portion 10L be not lower than 0.1 times and not higher than 0.2 times the tensile strength TS_HC (0.1×TS_HC≤TS_L≤0.2×TS_HC). This will allow the section L3 to deform earlier than the longitudinally middle 1m portion and reduce the decrease in the maximum load.

(Variations for Reinforcing Member)

The reinforcing member is not limited to the constructions shown in FIGS. 7 and 8. For example, the reinforcing member 3 is not limited to the inner space of the hat member 1, and may be positioned outside the hat member 1. Further, the reinforcing member may be constituted by a filler filling the space enclosed by the hat member 1 and closing plate 2.

Figure 10:
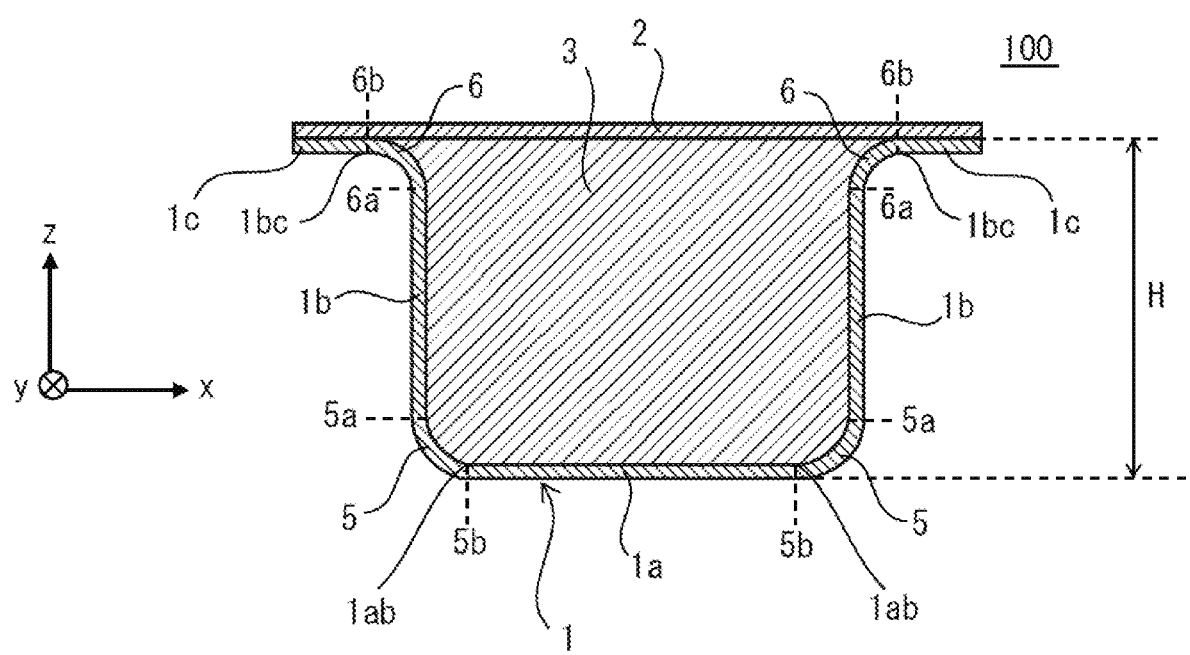
FIG. 10 is a cross-sectional view of a variation of the beam with a different reinforcing member.

FIG. 10 is a cross-sectional view of a variation of the beam with a different reinforcing member. In the implementation shown in FIG. 10, the reinforcing member 3 is a filler filling the space enclosed by the hat member 1 and closing plate 2. The filler may be formed of resin, for example. Alternatively, for example, a filler may fill the space defined by a partitioning plate, as shown in FIG. 8, having ends positioned to be in contact with the two walls 1b of the hat member 1.

Figure 11:
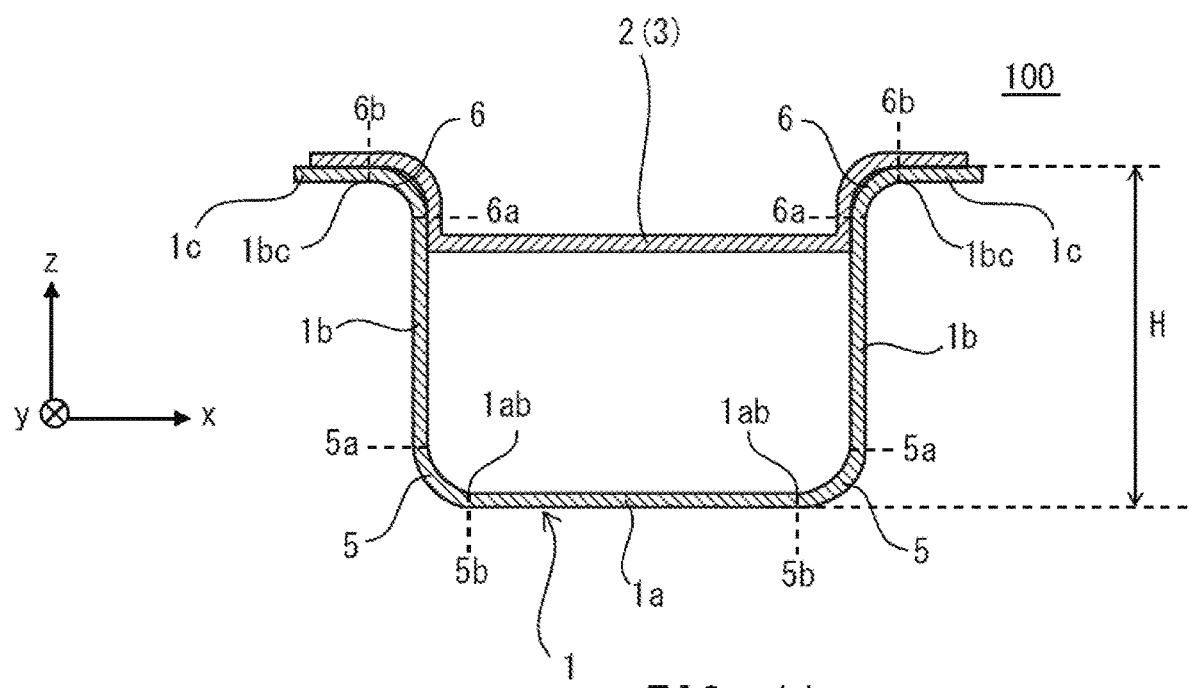
FIG. 11 is a cross-sectional view of another variation of the beam with a different reinforcing member.

FIG. 11 is a cross-sectional view of another variation of the beam with a different reinforcing member. In the implementation shown in FIG. 11, portions of the closing plate 2 also serve as a reinforcing member 3. The closing plate 2 is joined to the two flanges 1c of the hat member 1. The portion of the closing plate 2 that is located between the two flanges 1c is located closer to the top plate 1a than an imaginary line connecting the two flanges 1c is. That is, the portion of the closing plate 2 between the two flanges 1c is such that the closing plate is recessed toward the top plate 1a. Both ends of the portion of the closing plate 2 between the two flanges 1c is in contact with the two side walls 1b. That is, the closing plate 2 is curved from the joints between the closing plate and the two flanges 1c toward the top plate 1a and extends to be in contact with the inner surfaces of the two walls 1*b*. Thus, a portion of the closing plate 2 may be positioned to extend from the inner surface of one of the two walls 1*b* over to the inner surface of the other wall. Thus, a portion of the closing plate 2 may provide a reinforcing member for preventing the two walls 1*b* from deforming toward each other.

In the above-discussed implementations, the reinforcing member 3 creates a difference between the bending moment at which buckling occurs in the longitudinally middle 1*m* portion and the buckle bending moment at which buckling occurs in the low-strength portions. This reduces the difference between the tensile strength of the low-strength portions and the tensile strength of the longitudinally middle 1*m* portion. Other means than the reinforcing member 3 may be used to create a difference between the buckling bending moment at which buckling occurs in the longitudinally middle 1 *m* portion and the buckling bending moment at which buckling occurs in the low-strength portions.

For example, a through-hole may be formed in the walls 1*b* or top plate 1*a* of the low-strength portions 10L to create a difference between the longitudinally middle 1*m* portion and the low-strength portions in terms of the buckling bending moment at which buckling occurs. Alternatively, a difference may be created between the height H of the walls 1*b* of the low-strength portions 10L and the height H of the walls 1*b* of the high-strength portion 10H to create a difference between the longitudinally middle 1*m* portion and the low-strength portions in terms of the buckling bending moment at which buckling occurs. Alternatively, a difference may be created between the thickness of the walls 1*b* of the low-strength portions 10L (i.e. plate thickness) and the thickness of the walls 1*b* of the high-strength portions 10H (i.e. plate thickness) to create a difference between the longitudinally middle 1*m* portion and the low-strength portions 10L in terms of the buckling bending moment at which buckling occurs.

(Manner of Curving of Bumper Beam)

The bumper beam 100 shown in FIG. 1 is curved to protrude in the direction of the closing plate 2. The implementation shown in FIG. 1 includes two curved portions on both sides of the longitudinally middle 1*m* portion and between the two support portions 1*s*. A curved portion is a portion curved as viewed from a side (i.e. in the x-direction shown in FIG. 1). The portion between the two curved portions extends in a straight line in the longitudinal direction. Further, the portions located outward of the two curved portions as determined along the longitudinal direction each extend in a straight line. Thus, the bumper beam may be shaped to include a straight portion extending in a straight line and curved portions that are curved as viewed from a side (i.e. in the x-direction shown in FIG. 1). In the implementation shown in FIG. 1, curved portions are positioned on both sides of the straight portion as determined along the longitudinal direction. In other words, the straight portion is positioned between the curved portions. In a variation, a bumper beam may include straight portions positioned on both sides of the curved portions as determined along the longitudinal direction. Further, for example, as shown in FIG. 1, a bumper beam may be curved so as to be symmetrical as viewed in the direction perpendicular to the walls. The positional relationship between the low-strength portions and curved portions is not limited to any particular one.

In a further variation, a bumper beam may be curved with a curvature that is constant along the entire length. Alternatively, a bumper beam may be curved along the entire length and have a curvature that changes depending on the position as determined along the longitudinal direction.

(Manufacture Process)

The entire hat member 1 and closing plate 2 of the bumper beam 100 may be formed from one material. The hat member 1 may be formed from a steel plate, for example. The process for manufacturing a bumper beam 100 includes the step of fabricating a hat member 1 having low-strength portions 10L and a high-strength portion 10H, the step of fabricating a closing plate 2, and the step of joining the hat member 1 and closing plate 2. The step of fabricating a hat member 1 includes the sub-step of creating a difference in strength in the material to form low-strength portions. The process for manufacturing a bumper beam 100 further includes the step of causing the hat member 1 and closing plate 2 to curve. The hat member 1 and closing plate 2 are caused to curve by a bending method such as press bending, stretch bending, compression bending, roll bending, MOS bending or eccentric plug bending, for example.

The forming of the low-strength portions is not limited to a particular method; for example, a steel plate may be deformed by roll forming to have a hat-shaped cross section, and the material may be locally heated and quenched using a laser or by high-frequency heating, for example, to produce a hat member 1 including hardened regions. In such cases, the regions that have not been quenched constitute low-strength portions with relatively low strengths. Alternatively, the entire hat member 1 may be strengthened by thermal refining, and local annealing may then be performed to form low-strength portions.

Alternatively, the hat member 1 may be fabricated using hot pressing (hot stamping) techniques. During the step of hot pressing, heating or cooling conditions may be varied locally within the one and the same material to form low-strength portions in the material. For example, a steel plate may be heated to a temperature that causes steel to form a single-phase austenitic region (i.e. Ac3 temperature) or higher, and quenched while being shaped using a mold. A difference in the cooling rate during this is created such that the rapidly cooled portions provide a generally hard martensitic microstructure and the slowly cooled portions provide a soft mixed-phase microstructure with ferrite and pearlite or a bainitic microstructure. Thus, the slowly cooled portions provide low-strength portions. Alternatively, the entire member may be subjected to hot pressing to provide a high-strength portion of a martensite microstructure, and local quenching may then be performed to form low-strength portions.

The method of manufacturing a hat member 1 is not limited to the above-illustrated examples. For example, tailored blank or other known methods may be used to form a hat member 1 having low-strength portions.

Examples

For analysis, the present examples simulated the deformation of a structural member composed of a hat member and a closing plate found when the impacter was caused to hit the structural member. The simulations used analysis models of bumper beams having the same shape as in FIG. 1. The dimensions of the various elements in the analysis models were those in FIG. 4, where LS=900 mm. The deformation behavior of the bumper beam found when the impacter was caused to hit the longitudinally middle portion of the closing plate 2 was analyzed. In the simulations, the tensile strength of the high-strength portion and that of the low-strength portions were varied, and the tensile strengths of the high-strength portion and low-strength portions set when the low-strength portions deformed earlier than the longitudinally middle portion of the hat member were registered.

Table 1, provided below, shows the analysis results. Table 1 illustrates the relationship between the tensile strength TS of the low-strength portions for which a load due to an impact on the longitudinally middle $1m$ portion of the closing plate 2 caused the low-strength portions of the bumper beam to deform earlier than the longitudinally middle portion, on one hand, and the starting position of the low-strength portions, on the other. Starting position of the low-strength portions means the distance from the border between the low-strength portion and high-strength portion in the walls to the longitudinal middle. The values in the parentheses in Table 1 indicate the ratio of the tensile strength of the low-strength portions to the tensile strength of the longitudinally middle portion.

TABLE 1

| | Starting position of low-strength portion (distance from middle along longitudinal direction) | | |
|---|---|---|---|
| | 150 mm | 240 mm | 350 mm |
| Case 1 1.5 GPa, 2 t | 600 MPa (0.4) | 400 MPa (0.27) | — |
| Case 2 1.8 G, 2 t | 700 MPa (0.39) | 500 MPa (0.28) | 300 MPa (0.17) |
| Case 3 1.5 G, 2 t (with RF) | 1000 MPa (0.67) | 800 MPa (0.53) | 300 MPa (0.2) |
| Case 4 1.5 G, 2 t (1.2 t for low-strength portion) | | | 400 MPa (0.27) |
| Case 5 2 G, 1.8 t | 800 MPa (0.4) | 700 MPa (0.35) | 300 MPa (0.15) |
| Case 6 1.5 G, 1.2 t | 600 MPa (0.4) | 400 MPa (0.27) | — |
| Case 7 1.5 G, 1.6 t (with RF) | 1000 MPa (0.67) | 900 MPa (0.6) | 400 MPa (0.27) |

In Table 1, the conditions of Case 1 are described as follows: the tensile strength of the high-strength portion including the longitudinally middle portions of the walls and the outer high-strength portions was 1.5 GPa; the plate thickness of the entire hat member was 2 mm in a uniform manner; and no reinforcing member was provided. The conditions of Case 2 are described as follows: the tensile strength of the high-strength portion including the longitudinally middle portions of the walls and the outer high-strength portions was 1.8 GPa; the plate thickness of the entire hat member was 2 mm in a uniform manner; and no reinforcing member was provided. The conditions of Case 3 is described as follows: the tensile strength of the high-strength portion including the longitudinally middle portions of the walls and the outer high-strength portions was 1.5 GPa; the plate thickness of the entire hat member was 2 mm in a uniform manner; and a reinforcing member was provided in the high-strength portion. The conditions of Case 4 are described as follows: the tensile strength of the high-strength portion including the longitudinally middle portions of the walls and the outer high-strength portions was 1.5 GPa; the plate thickness of the hat member was 2 mm as measured in the high strength portion and outer high-strength portions and 1.2 mm as measured in the low-strength portion; and no reinforcing member was provided. The conditions of Case 5 are described as follows: the tensile strength of the high-strength portion including the longitudinally middle portions of the walls and the outer high-strength portions was 2 GPa; the plate thickness of the entire hat member was 1.8 mm in a uniform manner; and no reinforcing member was provided in the high-strength portion. The conditions of Case 6 are described as follows: the tensile strength of the high-strength portion including the longitudinally middle portions of the walls and the outer high-strength portions was 1.5 GPa; the plate thickness of the entire hat member was 1.2 mm in a uniform manner; and no reinforcing member was provided in the high-strength portion. The conditions of Case 7 are described as follows: the tensile strength of the high-strength portion including the longitudinally middle portions of the walls and the outer high-strength portions was 1.5 GPa; the plate thickness of the entire hat member was 1.6 mm in a uniform manner; and a reinforcing member was provided in the high-strength portion.

Table 2, provided below, shows the analysis results. Table 2 illustrates the relationship between the maximum load and the tensile strength of the low-strength portions. The results shown in Table 2 are analysis results obtained when the starting position of the low-strength portions, i.e. the distance from the longitudinal middle of the walls to the border between a low-strength portion and the high-strength portion was 150 mm. In Table 2, "OK" in parentheses means that a sharp break occurred in the low-strength portion, while "NG" means that a sharp break occurred in the longitudinally middle portion.

TABLE 2

| | Low-strength portion TS | | | | | | |
|---|---|---|---|---|---|---|---|
| | 1200 MPa | 1000 MPa | 900 MPa | 800 MPa | 700 MPa | 600 MPa | 500 MPa |
| Case 1 1.5 GPa, 2 t | | | | | 55 (NG) | 55 (OK) | 49 (OK) |
| Case 2 1.8 G, 2 t | | | | 66 (NG) | 63 (OK) | 56 (OK) | — |
| Case 3 1.5 G, 2 t (with RF) | 80 (NG) | 78 (OK) | 73 (OK) | 66 (OK) | — | — | — |
| Case 5 2 G, 1.8 t | | | | 60 (NG) | 56 (OK) | 53 (OK) | — | — |
| Case 7 1.5 G, 1.6 t (with RF) | 59 (NG) | 53 (OK) | — | — | — | — | — | conditions of Case 2 are described as follows: the tensile strength of the high-strength portion including the longitudinally middle portions of the walls and the outer high- Although an embodiment of the present invention has been described, the above-illustrated embodiment is merely an example for carrying out the present invention. Accordingly, the present invention is not limited to the above-illustrated embodiment, and the above-illustrated embodiment may be modified as necessary without departing from the spirit of the invention.

EXPLANATION OF CHARACTERS

1: hat member
1a: top plate
1b: walls
1c: flanges
2: closing plate
10L: low-strength portions
10H: high-strength portion

The invention claimed is:

1. A bumper beam comprising:
a closing plate; and
a hat member curved along a longitudinal direction to protrude in a direction of the closing plate,
wherein the hat member includes:
a top plate;
two first ridges each positioned on a respective one of both ends of the top plate;
two flanges joined to the closing plate;
two second ridges each positioned at an inner end of a respective one of the flanges; and
two walls each positioned between a respective one of the first ridges and a respective one of the second ridges,
wherein the hat member includes:
a high-strength portion including a longitudinally middle portion of each of the two walls,
the high-strength portion extending a length of at least 250 mm and having a tensile strength not lower than 1.5 GPa; and
a low-strength portion provided in the hat member curved along the longitudinal direction to protrude in the direction of the closing plate,
the low-strength portion located outward of the high-strength portion in the longitudinal direction,
the low-strength portion extending a length not smaller than a height of the walls as determined along the longitudinal direction,
the low-strength portion extending from one of the two second ridges through the two walls and the top plate to the other one of the two second ridges, and
the low-strength portion having a tensile strength lower than a tensile strength of the longitudinally middle portions of the two walls.

2. The bumper beam according to claim 1, wherein the tensile strength of the low-strength portion is lower than 1.5 GPa.

3. The bumper beam according to claim 2, wherein the tensile strength of the low-strength portion is higher than 590 MPa.

4. The bumper beam according to claim 1, wherein the top plate includes two support portions each positioned at a respective one of two separate locations, as determined along the longitudinal direction, on the top plate, where a member for supporting the bumper beam is attached to the support portions, and
a border between the low-strength portion and the high-strength portion on the walls is located between a position 125 mm away, as measured in the longitudinal direction, from a longitudinal middle of the walls, on one hand, and a position $13/36$ of a longitudinal distance between the two support portions away from the longitudinal middle of the walls.

5. The bumper beam according to claim 1, wherein the top plate includes two support portions each positioned at a respective one of two separate locations, as determined along the longitudinal direction, on the top plate, where a member for supporting the bumper beam is attached to the support portions, and
the low-strength portions are provided positioned on both sides of the high-strength portion and located between the two support portions.

6. The bumper beam according to claim 1, wherein the top plate includes two support portions each positioned at a respective one of two separate locations, as determined along the longitudinal direction, on the top plate, where a member for supporting the bumper beam is attached to the support portions,
if a distance between a middle of the walls and the low-strength portion as measured in the longitudinal direction is larger than 125 mm and equal to or smaller than $1/4$ of a longitudinal distance between the two support portions, then, the tensile strength of the low-strength portion is not larger than 0.4 times a lower one of the tensile strengths of the longitudinally middle portions of the two walls,
if the distance between the middle of the walls and the low-strength portion as measured in the longitudinal direction is larger than $1/4$ of the longitudinal distance between the two support portions and equal to or smaller than $13/36$ of the longitudinal distance between the two support portions, then, the tensile strength of the low-strength portion is not larger than 0.35 times the lower one of the tensile strengths of the longitudinally middle portions of the two walls, and
if the distance between the middle of the walls and the low-strength portion as measured in the longitudinal direction is larger than $13/36$ of the longitudinal distance between the two support portions and equal to or smaller than $1/2$ of the longitudinal distance between the two support portions, then, the tensile strength of the low-strength portion is not larger than 0.2 times the lower one of the tensile strengths of the longitudinally middle portions of the two walls.

7. The bumper beam according to claim 6, wherein, if the distance between the middle of the walls and the low-strength portion as measured in the longitudinal direction is larger than 125 mm and equal to or smaller than $1/4$ of the longitudinal distance between the two support portions, then, the tensile strength of the low-strength portion is not smaller than 0.33 times the lower one of the tensile strengths of the longitudinally middle portions of the two walls,
if the distance between the middle of the walls and the low-strength portion as measured in the longitudinal direction is larger than $1/4$ of the longitudinal distance between the two support portions, and equal to or smaller than $13/36$ of the longitudinal distance between the two support portions, then, the tensile strength of the low-strength portion is not smaller than 0.2 times the lower one of the tensile strengths of the longitudinally middle portions of the two walls, and
if the distance between the middle of the walls and the low-strength portion as measured in the longitudinal direction is larger than $13/36$ of the longitudinal distance between the two support portions, and equal to or smaller than $1/2$ of the longitudinal distance between the two support portions, then, the tensile strength of the low-strength portion is not smaller than 0.1 times the lower one of the tensile strengths of the longitudinally middle portions of the two walls.

8. The bumper beam according to claim 1, further including a reinforcing member attached to at least part of an area of the walls having the high-strength portion and an area of the closing plate overlapping the high-strength portion in the longitudinal direction.

9. The bumper beam according to claim 8, wherein the reinforcing member is provided in contact with the two walls and located between the two walls and closer to the closing plate than a middle portion, as determined along the height direction, of the walls.

10. The bumper beam according to claim 8, wherein, the top plate includes two support portions each positioned at a respective one of two separate locations, as determined along the longitudinal direction, on the top plate, where a member for supporting the bumper beam is attached to the support portions,
- if a distance between a middle of the walls and the low-strength portion as measured in the longitudinal direction is larger than 125 mm and equal to or smaller than ¼ of a longitudinal distance between the two support portions, then, the tensile strength of the low-strength portion is not larger than 0.68 times a lower one of the tensile strengths of the longitudinally middle portions of the two walls,
- if the distance between the middle of the walls and the low-strength portion as measured in the longitudinal direction is larger than ¼ of the longitudinal distance between the two support portions, and equal to or smaller than 13/36 of the longitudinal distance of the two support portions, then, the tensile strength of the low-strength portion is not larger than 0.54 times the lower one of the tensile strengths of the longitudinally middle portions of the two walls, and
- if the distance between the middle of the walls and the low-strength portion as measured in the longitudinal direction is larger than 13/36 of the longitudinal distance between the two support portions, and equal to or smaller than ½ of the longitudinal distance between the two support portions, then, the tensile strength of the low-strength portion is not larger than 0.2 times the lower one of the tensile strengths of the longitudinally middle portions of the two walls.

11. The bumper beam according to claim 10, wherein, if the distance between the middle of the walls and the low-strength portion as measured in the longitudinal direction is larger than 125 mm and equal to or smaller than ¼ of the longitudinal distance between the two support portions, then, the tensile strength of the low-strength portion is not smaller than 0.6 times the lower one of the tensile strengths of the longitudinally middle portions of the two walls,
- if the distance between the middle of the walls and the low-strength portion as measured in the longitudinal direction is larger than ¼ of the longitudinal distance between the two support portions, and equal to or smaller than 13/36 of the longitudinal distance between the two support portions, then, the tensile strength of the low-strength portion is not smaller than 0.45 times the lower one of the tensile strengths of the longitudinally middle portions of the two walls, and
- if the distance between the middle of the walls and the low-strength portion as measured in the longitudinal direction is larger than 13/36 times the longitudinal distance between the two support portions, and equal to or smaller than ½ of the longitudinal distance between the two support portions, then, the tensile strength of the low-strength portion is not smaller than 0.1 times the lower one of the tensile strengths of the longitudinally middle portions of the two walls.

12. The bumper beam according to claim 1, wherein a through-hole is provided in part of the low-strength portion of the top plate or the two walls.

13. The bumper beam according to claim 1, wherein, for each of the two walls, the height of the wall as measured in at least part of the low-strength portion is smaller than the height of the wall as measured at the longitudinal middle.

14. The bumper beam according to claim 1, wherein, for each of the two walls, the thickness of the wall as measured in at least part of the low-strength portion is smaller than the thickness of the wall as measured at the longitudinal middle.

* * * * *